United States Patent
Janssen et al.

(10) Patent No.: US 12,193,366 B2
(45) Date of Patent: Jan. 14, 2025

(54) METHOD OF GROWING PLANTS

(71) Applicant: ROCKWOOL A/S, Hedehusene (DK)

(72) Inventors: Frank Hendrikus Peter Janssen, Hedehusene (DK); Dorte Bartnik Johansson, Hedehusene (DK); Miroslav Nikolic, Hedehusene (DK)

(73) Assignee: Rockwool A/S, Hedehusene (DK)

( * ) Notice: Subject to any disclaimer, the term of this patent is extended or adjusted under 35 U.S.C. 154(b) by 503 days.

(21) Appl. No.: 17/449,705

(22) Filed: Oct. 1, 2021

(65) Prior Publication Data

US 2022/0201949 A1 Jun. 30, 2022

Related U.S. Application Data

(63) Continuation of application No. PCT/EP2020/088061, filed on Dec. 30, 2020.

(51) Int. Cl.
*A01G 24/18* (2018.01)
*B01J 19/24* (2006.01)
(Continued)

(52) U.S. Cl.
CPC .......... *A01G 24/18* (2018.02); *B01J 19/2415* (2013.01); *C03C 13/06* (2013.01); *C03C 25/32* (2013.01); *C07G 1/00* (2013.01); *C08H 6/00* (2013.01); *C08L 97/005* (2013.01); *B01J 2219/24* (2013.01); *C08L 2201/54* (2013.01)

(58) Field of Classification Search
CPC ......... A01G 24/18; A01G 24/10; A01G 24/00
See application file for complete search history.

(56) References Cited

U.S. PATENT DOCUMENTS 3,923,532 A 12/1975 Morman
10,203,282 B2 * 2/2019 Mente .................... G01N 21/64
(Continued)

FOREIGN PATENT DOCUMENTS

CN 2351274 12/1999
CN 1944014 A 4/2007
(Continued)

OTHER PUBLICATIONS

International Search Report and Written Opinion, International Application No. PCT/EP2021/077189, mail date Jan. 18, 2022.
(Continued)

*Primary Examiner* — Kristen C Hayes
(74) *Attorney, Agent, or Firm* — SALIWANCHIK, LLOYD & EISENSCHENK

(57) ABSTRACT

A method of growing plants in a coherent growth substrate product can comprise: providing at least one coherent growth substrate product comprising man-made vitreous fibres (MMVF) bonded with a cured aqueous binder composition free of phenol and formaldehyde; positioning one or more seeds, seedlings, cuttings or plants in contact with the growth substrate product; and irrigating the growth substrate product. The aqueous binder composition prior to curing can comprise; a component (i) in form of one or more lignosulfonate lignins having a carboxylic acid group content of 0.03 to 1.4 mmol/g, based on the dry weight of the lignosulfonate lignins; and a component (ii) in form of one or more cross-linkers.

39 Claims, 1 Drawing Sheet

(51) Int. Cl.
  *C03C 13/06* (2006.01)
  *C03C 25/32* (2018.01)
  *C07G 1/00* (2011.01)
  *C08H 7/00* (2011.01)
  *C08L 97/00* (2006.01)

(56) References Cited

U.S. PATENT DOCUMENTS

| | | | |
|---|---|---|---|
| 10,435,329 | B2 | 10/2019 | Allais et al. |
| 2004/0034154 | A1 | 2/2004 | Tutin et al. |
| 2006/0150494 | A1 | 7/2006 | Masson |
| 2007/0173588 | A1 | 7/2007 | Espiard et al. |
| 2010/0292354 | A1* | 11/2010 | Gudik-Sorensen ..... C03C 25/32 523/123 |
| 2015/0373924 | A1* | 12/2015 | Janssen .................. A01G 24/44 47/65.5 |
| 2017/0198142 | A1 | 7/2017 | Hampson et al. |
| 2018/0002225 | A1 | 1/2018 | Allais et al. |
| 2018/0009708 | A1 | 1/2018 | Allais et al. |
| 2018/0201542 | A1 | 7/2018 | Hansen |
| 2021/0307263 | A1* | 10/2021 | Janssen .................. A01G 24/30 |
| 2023/0174414 | A1* | 6/2023 | Bartnik ..................... C08H 6/00 501/36 |

FOREIGN PATENT DOCUMENTS

| | | |
|---|---|---|
| CN | 107286873 | 10/2017 |
| EP | 1578879 | 1/2007 |
| EP | 1770123 A1 | 4/2007 |
| EP | 1889859 | 2/2008 |
| EP | 1457107 | 5/2012 |
| EP | 3299421 | 3/2018 |
| EP | 3348725 | 7/2018 |
| EP | 2721102 | 9/2018 |
| EP | 3632866 | 4/2020 |
| EP | 3250534 | 12/2020 |
| FR | 2976583 | 12/2012 |
| FR | 2976584 | 12/2012 |
| FR | 2976585 | 12/2012 |
| FR | 3032194 | 8/2016 |
| FR | 3032195 | 8/2016 |
| GB | 2113517 | 8/1983 |
| NO | 95/34517 | 12/1995 |
| SE | 1950773 | 12/2020 |
| WO | 98/31825 | 7/1998 |
| WO | 2008/009278 | 1/2008 |
| WO | 2008/009460 | 1/2008 |
| WO | 2008/009461 | 1/2008 |
| WO | 2008/009462 | 1/2008 |
| WO | 2008/009465 | 1/2008 |
| WO | 2008/009467 | 1/2008 |
| WO | 2009/090053 | 7/2009 |
| WO | 2010/093785 | 8/2010 |
| WO | 2012/028650 | 3/2012 |
| WO | 2012/167252 | 12/2012 |
| WO | 2012/172262 | 12/2012 |
| WO | 2015/022550 | 2/2015 |
| WO | 2016/009054 | 1/2016 |
| WO | 2016/120575 | 8/2016 |
| WO | 2017/074771 | 5/2017 |
| WO | 2017/114723 | 7/2017 |
| WO | 2017/114724 | 7/2017 |
| WO | 2017/194722 | 11/2017 |
| WO | 2018/158677 | 9/2018 |
| WO | 2018/193166 | 10/2018 |
| WO | 2019/202475 | 10/2019 |
| WO | 2019/202477 | 10/2019 |
| WO | 2020/008311 | 1/2020 |
| WO | 2020/070341 | 4/2020 |
| WO | 2020/104523 | 5/2020 |
| WO | 2020/109983 | 6/2020 |
| WO | 2020/261087 | 12/2020 |
| WO | 2021/124125 | 6/2021 |
| WO | 2021/198474 | 10/2021 |

OTHER PUBLICATIONS

International Search Report and Written Opinion, International Application No. PCT/EP2021/077185, mail date Jan. 18, 2022.
International Search Report and Written Opinion, International Application No. PCT/EP2021/077186, mail date Jan. 18, 2022.
International Search Report and Written Opinion, International Application No. PCT/EP2021/077191, mail date Jan. 18, 2022.
International Search Report and Written Opinion, International Application No. PCT/EP2021/077194, mail date Jan. 18, 2022.
International Search Report and Written Opinion, International Application No. PCT/2021/077183, mail date Jan. 18, 2022.
International Search Report and Written Opinion, International Application No. PCT/EP2021/077195, mail date Jan. 18, 2022.
International Search Report, International Application No. PCT/EP2021/077193, mail date Nov. 8, 2021.
International Search Report and Written Opinion, International Application No. PCT/EP2021/077135, mail date Jan. 18, 2022.
International Search Report, International Application No. PCT/EP2021/077180, mail date Jan. 18, 2022.

* cited by examiner

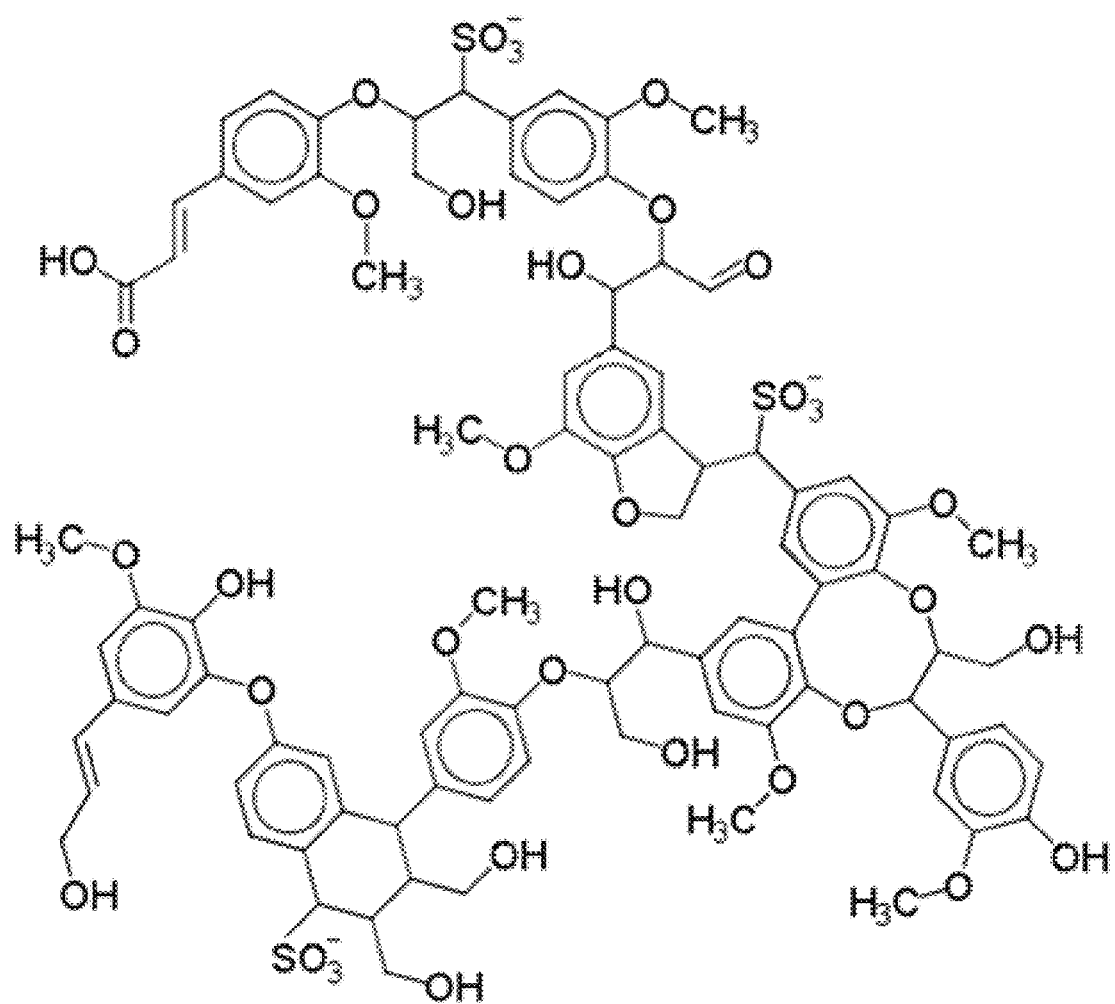

METHOD OF GROWING PLANTS

CROSS REFERENCE TO RELATED APPLICATION

The present application is a continuation application of International Patent Application No. PCT/EP2020/088061, filed Dec. 30, 2020, the disclosure of which is hereby incorporated by reference in its entirety, including all figures, tables, and drawings.

FIELD OF THE INVENTION

The present invention relates to a method of growing plants in a coherent growth substrate, a coherent growth substrate product, and use of a coherent growth substrate.

BACKGROUND OF THE INVENTION

It has been known for many years to grow plants in coherent growth substrates formed from man-made vitreous fibres (MMVF). MMVF products for this purpose, which are typically provided as a coherent plug, block or slab, generally include a binder in order to provide structural integrity to the product.

Historically, the primary binders of choice have been phenol-formaldehyde resins and phenol-formaldehyde urea resins, such as those disclosed in WO2009/090053, WO2008/009467, WO2008/009462, WO2008/009461, WO2008/009460 and WO2008/009465. These binders are economical to produce and provide excellent mechanical handling properties, which is highly important for plant growth substrates due to the use of automatic equipment in handling and the large amount of water held in the substrate. It is undesirable for the substrate to become damaged during handling or for the substrate to lose its rigidity and shape when holding water.

However, existing and proposed legislation directed to the lowering or elimination of formaldehyde emissions has led to the development of formaldehyde-free binders, such as those described in WO2017/114723, WO2017/114724, WO2012/028650.

At least the majority of previously known binder compositions for plant growth substrates have starting materials stemming from fossil fuels. There is an on-going trend for consumers to prefer products that are fully or at least partly produced from renewable materials and there is therefore a need to provide binders for plant growth substrates which are at least partly produced from renewable materials.

Binder compositions based on renewable materials have been proposed before, for example in WO2017/114723 and WO2017/114724. However, there are still some disadvantages associated with MMVF products prepared with these binders in terms of mechanical properties, when compared with MMVF products prepared with phenol-formaldehyde resins. In addition, such binders are often made from expensive starting materials.

Binders based on lignin are known to be used in combination with cellulose fibres, lignocellulose fibres or soil and peat, for example in GB2113517, US2006/0150494, EP1456107B3 and WO2008/009278. WO2018/158677 discloses a culture medium comprising a non-soil based substrate, microfibrillated cellulose and a hydrophilic or amphiphilic polymer. The hydrophilic polymer may be lignin, lignin derivatives or lignosulfonates. However, the hydrophilic polymer does not act as a binder. There are disadvantages with these products when compared to existing MMVF products prepared with phenol-formaldehyde resins, particularly in terms of mechanical and water absorption properties.

In addition, there is an ongoing desire to improve the water related properties of plant growth substrates, such as water absorption. There is also an ongoing desire to reduce the phytotoxicity of binders used in plant growth substrates.

There is a desire to use water and nutrients as efficiently as possible during the growing process. This is both for cost and environmental reasons. In particular, waste water containing nutrients is difficult to dispose of due to environmental legislation. It is therefore desirable to improve the water holding properties so that the amount of waste water (also called drain) is reduced Furthermore, there is an ongoing desire to reduce the amount and number of components required to produce plant growth substrates. Typically additives such as wetting agents are added to plant growth substrates in order to improve hydrophilicity. However, for environmental and cost efficiency purposes, it would be desirable to provide a binder that does not require the further addition of a wetting agent.

It would also be desirable to produce a binder that can be used in lower quantities than other binders, without compromising the mechanical properties. Therefore, it would be desirable to produce a binder for plant growth substrates which is formaldehyde-free but has equivalent or superior mechanical handling properties (e.g. delamination strength and wet strength) as phenol-formaldehyde binders. It would be desirable for such a binder to have improved water holding properties (e.g. water absorption), thus reducing water wastage. It would be desirable for the binder to have lower phytotoxicity. Furthermore, it would be desirable for such a binder to be economical to produce and be based predominantly on renewable sources. Finally, it would be desirable for such a binder to be used in reduced amounts and not to require the further addition of wetting agent.

SUMMARY OF THE INVENTION

The plant growth substrate used in the present invention solves the above problems.

In a first aspect of the invention, there is provided a method of growing plants in a coherent growth substrate product, the method comprising:
  providing at least one coherent growth substrate product comprising man-made vitreous fibres (MMVF) bonded with a cured aqueous binder composition free of phenol and formaldehyde;
  positioning one or more seeds, seedlings, cuttings or plants in contact with the growth substrate product;
  irrigating the growth substrate product;
  wherein the aqueous binder composition prior to curing comprises;
    a component (i) in form of one or more lignosulfonate lignins having a carboxylic acid group content of 0.03 to 1.4 mmol/g, based on the dry weight of the lignosulfonate lignins, and
    a component (ii) in form of one or more cross-linkers.

In a second aspect of the invention, there is provided a coherent growth substrate product comprising man-made vitreous fibres (MMVF) bonded with a cured aqueous binder composition free of phenol and formaldehyde, wherein the aqueous binder composition prior to curing comprises:

a component (i) in form of one or more lignosulfonate lignins having a carboxylic acid group content of 0.03 to 1.4 mmol/g, based on the dry weight of the lignosulfonate lignins, a component (ii) in form of one or more cross-linkers.

In a third aspect of the invention there is provided an array of two or more coherent growth substrate products, wherein the coherent growth substrate products comprise man-made vitreous fibres (MMVF) bonded with a cured aqueous binder composition free of phenol and formaldehyde, wherein the aqueous binder composition prior to curing comprises:

a component (i) in form of one or more lignosulfonate lignins having a carboxylic acid group content of 0.03 to 1.4 mmol/g, based on the dry weight of the lignosulfonate lignins, a component (ii) in form of one or more cross-linkers.

In a fourth aspect of the invention there is provided use of a coherent growth substrate product for growing plants, wherein the coherent growth substrate product comprises man-made vitreous fibres (MMVF) bonded with a cured aqueous binder composition free of phenol and formaldehyde, wherein the aqueous binder composition prior to curing comprises:

a component (i) in form of one or more lignosulfonate lignins having a carboxylic acid group content of 0.03 to 1.4 mmol/g, based on the dry weight of the lignosulfonate lignins, a component (ii) in form of one or more cross-linkers.

In a fifth aspect of the invention, there is provided a method of making a growth substrate product comprising the steps of:

(i) providing MMVF;
(ii) spraying the MMVF with an aqueous binder composition free of phenol and formaldehyde;
(iii) collecting and consolidating the MMVF; and
(iv) curing the aqueous binder composition;

wherein the aqueous binder composition prior to curing comprises:

a component (i) in form of one or more lignosulfonate lignins having a carboxylic acid group content of 0.03 to 1.4 mmol/g, based on the dry weight of the lignosulfonate lignins, a component (ii) in form of one or more cross-linkers.

In a sixth aspect of the invention, there is provided use of a lignin component in form of one or more lignosulfonate lignins having a carboxylic acid group content of 0.03 to 1.4 mmol/g, based on the dry weight of the lignosulfonate lignins, for the preparation of a binder composition free of phenol and formaldehyde for a coherent growth substrate product comprising man-made vitreous fibres (MMVF) bonded.

The present inventors have surprisingly discovered that it is possible to produce a formaldehyde-free binder which leads to a growth substrate that has equivalent or even superior mechanical handling properties to phenol-formaldehyde binders. The inventors also produced such a binder that leads to a growth substrate with improved water holding properties (e.g. water absorption) and lower phytotoxicity levels, which is highly desirable for plant growth and development. This results in reduced water wastage (i.e. drain). The inventors produced such a binder that is economical and is based predominantly on renewable sources. Finally, this binder can be used in low quantities and does not require the addition of a wetting agent to the growth substrate.

DESCRIPTION OF THE FIGURES

FIG. 1 shows commonly used model structure of lignosulfonates.

DETAILED DESCRIPTION

The present invention relates to a method of growing plants in a coherent growth substrate product, the method comprising:

providing at least one coherent growth substrate product comprising man-made vitreous fibres (MMVF) bonded with a cured aqueous binder composition free of phenol and formaldehyde;

positioning one or more seeds, seedlings, cuttings or plants in contact with the growth substrate product;

irrigating the growth substrate product;

wherein the aqueous binder composition prior to curing comprises;

a component (i) in form of one or more lignosulfonate lignins having a carboxylic acid group content of 0.03 to 1.4 mmol/g, based on the dry weight of the lignosulfonate lignins, a component (ii) in form of one or more cross-linkers.

The method of the present invention comprises a coherent growth substrate product comprising man-made vitreous fibres (MMVF). The man-made vitreous fibres (MMVF) can have any suitable oxide composition. The fibres can be glass fibres, ceramic fibres, basalt fibres, slag fibres or rock or stone fibres. The fibres are preferably of the types generally known as rock, stone or slag fibres, most preferably stone fibres.

Stone fibres commonly comprise the following oxides, in percent by weight:

$SiO_2$: 30 to 51
$Al_2O_3$: 12 to 30
CaO: 8 to 30
MgO: 2 to 25
FeO (including $Fe_2O_3$): 2 to 15
$Na_2O+K_2O$: not more than 10
CaO+MgO: 10 to 30.

In preferred embodiments the MMVF have the following levels of elements, calculated as oxides in wt %:

$SiO_2$: at least 30, 32, 35 or 37; not more than 51, 48, 45 or 43
$Al_2O_3$: at least 12, 16 or 17; not more than 30, 27 or 25
CaO: at least 8 or 10; not more than 30, 25 or 20
MgO: at least 2 or 5; not more than 25, 20 or 15
FeO (including Fe2O3): at least 4 or 5; not more than 15, 12 or 10
FeO+MgO: at least 10, 12 or 15; not more than 30, 25 or 20
$Na_2O+K_2O$: zero or at least 1; not more than 10
CaO+MgO: at least 10 or 15; not more than 30 or 25
$TiO_2$: zero or at least 1; not more than 6, 4 or 2
$TiO_2$+FeO: at least 4 or 6; not more than 18 or 12
$B_2O_3$: zero or at least 1; not more than 5 or 3
$P_2O_5$: zero or at least 1; not more than 8 or 5
Others: zero or at least 1; not more than 8 or 5

The MMVF made by the method of the invention preferably have the composition in wt %:

$SiO_2$ 35 to 50
$Al_2O_3$ 12 to 30
$TiO_2$ up to 2
$Fe_2O_3$ 3 to 12
CaO 5 to 30
MgO up to 15

Na$_2$O 0 to 15
K$_2$O 0 to 15
P$_2$O$_5$ up to 3
MnO up to 3
B$_2$O$_3$ up to 3

Another preferred composition for the MMVF is as follows in wt %:
SiO$_2$ 39-55% preferably 39-52%
Al$_2$O$_3$ 16-27% preferably 16-26%
CaO 6-20% preferably 8-18%
MgO 1-5% preferably 1-4.9%
Na$_2$O 0-15% preferably 2-12%
K$_2$O 0-15% preferably 2-12%
R$_2$O (Na$_2$O+K$_2$O) 10-14.7% preferably 10-13.5%
P$_2$O$_5$ 0-3% preferably 0-2%
Fe$_2$O$_3$ (iron total) 3-15% preferably 3.2-8%
B$_2$O$_3$ 0-2% preferably 0-1%
TiO$_2$ 0-2% preferably 0.4-1%
Others 0-2.0%.

Glass fibres commonly comprise the following oxides, in percent by weight:
SiO$_2$: 50 to 70
Al$_2$O$_3$: 10 to 30
CaO: not more than 27
MgO: not more than 12.

Glass fibres can also contain the following oxides, in percent by weight:
Na$_2$O+K$_2$O: 8 to 18, in particular Na$_2$O+K$_2$O greater than CaO+MgO
B$_2$O$_3$: 3 to 12.

Some glass fibre compositions can contain Al$_2$O$_3$ less than 2%.

The geometric mean fibre diameter is often in the range of 1.5 to 10 microns, in particular 2 to 8 microns, preferably 2 to 5 microns. The inventors found that this range of geometric fibre diameter positively affects capillarity thus improving water distribution over height and water uptake in the growth substrate.

The growth substrate product is in the form of a coherent mass. That is, the growth substrate is generally a coherent matrix of man-made vitreous fibres, which has been produced as such, but can also be formed by granulating a slab of mineral wool and consolidating the granulated material. A coherent substrate is a single, unified substrate.

Preferably the growth substrate product according to the invention comprises at least 90 wt % man-made vitreous fibres by weight of the total solid content of the growth substrate. An advantage of having such an amount of fibres present in the growth substrate product is that there are sufficient pores formed between the fibres to allow the growth substrate product to hold water and nutrients for the plant, whilst maintaining the ability for roots of the plants to permeate the growth substrate product. The remaining solid content may be made up primarily of binder.

The growth substrate according to the invention comprises, prior to curing, an aqueous binder composition free of phenol and formaldehyde comprising:
a component (i) in form of one or more lignosulfonate lignins having a carboxylic acid group content of 0.03 to 1.4 mmol/g, based on the dry weight of the lignosulfonate lignins, and
a component (ii) in form of one or more cross-linkers.

In one embodiment, the aqueous binder composition comprises:
a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins,
a component (ii) in form of one or more cross-linkers,
with the proviso that the aqueous binder composition does not comprise a cross-linker selected from epoxy compounds having a molecular weight M$_w$ of 500 or less.

In one embodiment, the aqueous binder composition comprises:
a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins,
a component (ii) in form of one or more cross-linkers,
with the proviso that the aqueous binder composition does not comprise a cross-linker selected from:
carbonyl compounds selected from aldehydes, carbonyl compounds of the formula R—[C(O)R$_1$]$_x$
in which:
R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, R$_1$ represents a hydrogen atom or a C$_1$-C$_{10}$ alkyl radical, and x varies from 1 to 10.

In one embodiment, the aqueous binder composition comprises:
a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins,
a component (ii) in form of one or more cross-linkers,
with the proviso that the aqueous binder composition does not comprise a cross-linker selected from polyamines.

In one embodiment, the aqueous binder composition comprises:
a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins,
a component (ii) in form of one or more cross-linkers,
with the proviso that the aqueous binder composition does not comprise a cross-linker selected from mono- and oligosaccharides.

In one embodiment, the aqueous binder composition comprises:
a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins,
a component (ii) in form of one or more cross-linkers selected from:
β-hydroxyalkylamide-cross-linkers, such as N-(2-hydroxyisopropyl)amide-cross-linkers, such as N-(2-hydroxyethyl)amide-cross-linkers, such as N-(2-hydroxyethyl)adipamide-cross-linkers, such as N,N,N',N'-tetrakis(2-hydroxyethyl)adipamide and/or
the group consisting of multifunctional organic amines such as an alkanolamine, diamines, such as hexamethyldiamine, and/or
epoxy compounds having a molecular weight of more than 500, such as an epoxidised oil based on fatty acid triglyceride or one or more flexible oligomer or polymer, such as a low Tg acrylic based polymer, such as a low Tg vinyl based polymer, such as low Tg polyether, which contains reactive functional groups such as carbodiimide groups, such as anhydride groups, such as oxazoline groups, such as amino groups, such as epoxy groups, and/or one or more cross-linkers in form of multifunctional carbodiimides, such as aliphatic multifunctional carbodiimides, and/or Primid XL-552, with the proviso that the aqueous binder composition does not comprise a cross-linker selected from:

epoxy compounds having a molecular weight $M_w$ of 500 or less carbonyl compounds selected from aldehydes, carbonyl compounds of the formula $R-[C(O)R_1]_x$ in which:

R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, $R_1$ represents a hydrogen atom or a $C_1$-$C_{10}$ alkyl radical, and x varies from 1 to 10, polyamines.

Optionally, the aqueous binder composition additionally comprises a component (iii) in form of one or more plasticizers.

In one embodiment, the aqueous binder composition comprises:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers;

a component (iii) in form of one or more plasticizers.

In one embodiment, the aqueous binder composition comprises:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers;

a component (iii) in form of one or more plasticizers, with the proviso that the aqueous binder composition does not comprise a cross-linker selected from epoxy compounds having a molecular weight $M_w$ of 500 or less.

In one embodiment, the aqueous binder composition comprises:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers;

a component (iii) in form of one or more plasticizers, with the proviso that the aqueous binder composition does not comprise a cross-linker selected from:

carbonyl compounds selected from aldehydes, carbonyl compounds of the formula $R-[C(O)R_1]_x$ in which:

R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, $R_1$ represents a hydrogen atom or a $C_1$-$C_{10}$ alkyl radical, and x varies from 1 to 10.

In one embodiment, the aqueous binder composition comprises:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers;

a component (iii) in form of one or more plasticizers, with the proviso that the aqueous binder composition does not comprise a cross-linker selected from polyamines.

In one embodiment, the aqueous binder composition comprises:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers;

a component (iii) in form of one or more plasticizers, with the proviso that the aqueous binder composition does not comprise a cross-linker selected from mono- and oligosaccharides.

In one embodiment, the aqueous binder composition comprises:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers selected from β-hydroxyalkylamide-cross-linkers, and/or epoxy compounds having a molecular weight of more than 500, such as an epoxidised oil based on fatty acid triglyceride or one or more flexible oligomer or polymer, such as a low Tg acrylic based polymer, such as a low Tg vinyl based polymer, such as low Tg polyether, which contains reactive functional groups such as carbodiimide groups, such as anhydride groups, such as oxazoline groups, such as amino groups, such as epoxy groups, and/or one or more cross-linkers in form of multifunctional carbodiimides, such as aliphatic multifunctional carbodiimides; and/or Primid XL-552;

a component (iii) in form of one or more plasticizers, with the proviso that the aqueous binder composition does not comprise a cross-linker selected from epoxy compounds having a molecular weight $M_w$ of 500 or less carbonyl compounds selected from aldehydes, carbonyl compounds of the formula $R-[C(O)R_1]_x$ in which:

R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, $R_1$ represents a hydrogen atom or a $C_1$-$C_{10}$ alkyl radical, and x varies from 1 to 10, polyamines.

In a preferred embodiment, the binders are formaldehyde free.

For the purpose of the present application, the term "formaldehyde free" is defined to characterize a MMVF product where the emission is below 5 µg/m²/h of formaldehyde from the MMVF product, preferably below 3 µg/m²/h. Preferably, the test is carried out in accordance with ISO 16000 for testing aldehyde emissions.

In a preferred embodiment, the binders are phenol free.

For the purpose of the present application, the term "phenol free" is defined in such a way that the aqueous binder composition does contain phenol

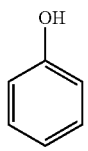

in an amount of 0.25 wt.-%, such as 0.1 wt.-%, such as 0.05 wt.-%, based on the total weight of an aqueous composition having a dry solids binder content of 15 wt. %.

In one embodiment, the binder composition does not contain added formaldehyde.

In one embodiment, the binder composition does not contain added phenol.

For the purpose of the present invention, the term "mono- and oligosaccharides" is defined to comprise monosaccharides and oligosaccharides having 10 or less saccharide units.

For the purpose of the present invention, the term "sugar" is defined to comprise monosaccharides and oligosaccharides having 10 or less saccharide units.

Component (i)

Component (i) is in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins.

Lignin, cellulose and hemicellulose are the three main organic compounds in a plant cell wall. Lignin can be thought of as the glue, that holds the cellulose fibres together. Lignin contains both hydrophilic and hydrophobic groups. It is the second most abundant natural polymer in the world, second only to cellulose, and is estimated to represent as much as 20-30% of the total carbon contained in the biomass, which is more than 1 billion tons globally.

The lignosulfonate process introduces large amount of sulfonate groups making the lignin soluble in water but also in acidic water solutions. Lignosulfonates has up to 8% sulfur as sulfonate, whereas kraft lignin has 1-2% sulfur, mostly bonded to the lignin. The molecular weight of lignosulfonate is 15.000-50.000 g/mol. The typical hydrophobic core of lignin together with large number of ionized sulfonate groups make this lignin attractive as a surfactant and it often finds application in dispersing cement etc.

To produce lignin-based value-added products, lignin should be first separated from biomass, for which several methods can be employed. Kraft and sulfite pulping processes are known for their effective lignin separation from wood, and hence, are used worldwide. Kraft lignin is separated from wood with the help of NaOH and $Na_2S$. Lignins from sulfite pulping processes are denoted as lignosulfonates, and are produced by using sulfurous acid and/or a sulfite salt containing magnesium, calcium, sodium, or ammonium at varying pH levels. Currently, lignosulfonates account for 90% of the total market of commercial lignin, and the total annual worldwide production of lignosulfonates is approximately 1.8 million tons. Lignosulfonates have generally abundance of sulfonic groups, and thus, a higher amount of sulfur than kraft lignin. Due to the presence of the sulfonated group, lignosulfonates are anionically charged and water soluble. The molecular weights (Mw) of lignosulfonates can be similar to or larger than that of kraft lignin. Due to their unique properties, lignosulfonates have a wide range of uses, such as animal feed, pesticides, surfactants, additives in oil drilling, stabilizers in colloidal suspensions, and as plasticizers in concrete admixtures. However, the majority of new pulp mills employ kraft technology for pulp production, and thus, kraft lignin is more readily available for value-added production.

However, lignosulfonates and kraft lignin have different properties coming from different isolation processes and thus distribution of functional groups. High level of sulfonic groups in lignosulfonates, generally at least one for every four C9 units, makes lignosulfonates strongly charged at all pH levels in water. This abundance of ionisable functional groups can explain most of the differences compared to other technical lignins. Higher charge density allows easier water solubility and higher solid content in solution possible compared to kraft lignin. Also, for the same reason, lignosulfonates will have lower solution viscosity compared to kraft lignin at the same solid content which can facilitate handling and processing. Commonly used model structure of lignosulfonates is shown on FIG. 1.

In one embodiment, component (i) is having a carboxylic acid group content of 0.05 to 0.6 mmol/g, such as 0.1 to 0.4 mmol/g, based on the dry weight of lignosulfonate lignins.

In one embodiment, component (i) is in form of one or more lignosulfonate lignins having an average carboxylic acid group content of less than 1.8 groups per macromolecule considering the M_n wt. average of component (i), such as less than 1.4 such as less than 1.1 such as less than 0.7 such as less than 0.4.

In one embodiment, component (i) is having a content of phenolic OH groups of 0.3 to 2.5 mmol/g, such as 0.5 to 2.0 mmol/g, such as 0.5 to 1.5 mmol/g. based on the dry weight of lignosulfonate lignins.

In one embodiment, component (i) is having a content of aliphatic OH groups of 1.0 to 8.0 mmol/g, such as 1.5 to 6.0 mmol/g, such as 2.0 to 5.0 mmol/g, based on the dry weight of lignosulfonate lignins.

In one embodiment, component (i) comprises ammoniumlignosulfonates and/or calciumlignosulfonates, and/or magnesiumlignosulfonates, and any combinations thereof.

In one embodiment, component (i) comprises ammoniumlignosulfonates and calciumlignosulfonates, wherein the molar ratio of $NH_4^+$ to $Ca^{2+}$ is in the range of 5:1 to 1:5, in particular 3:1 to 1:3.

For the purpose of the present invention, the term lignosulfonates encompasses sulfonated kraft lignins.

In one embodiment, component (i) is a sulfonated kraft lignin.

In one embodiment, the aqueous binder composition contains added sugar in an amount of 0 to 5 wt.-%, such as less than 5 wt.-%, such as 0 to 4.9 wt.-%, such as 0.1 to 4.9 wt.-%, based on the weight of lignosulfonate and sugar.

In one embodiment, the aqueous binder composition comprises component (i), i.e. the lignosulfonate, in an amount of 50 to 98 wt.-%, such as 65 to 98 wt.-%, such as 80 to 98 wt.-%, based on the total weight of components (i) and (ii).

In one embodiment, the aqueous binder composition comprises component (i) in an amount of 50 to 98 wt.-%, such as 65 to 98 wt.-%, such as 80 to 98 wt.-%, based on the dry weight of components (i), (ii), and (iii).

For the purpose of the present invention, content of lignin functional groups is determined by using $^{31}P$ NMR as characterization method.

Sample preparation for $^{31}P$ NMR is performed by using 2-chloro-4,4,5,5-tetramethyl-1,3,2-dioxaphospholane (TMDP) as phosphitylation reagent and cholesterol as internal standard. Integration is according to the work of Granata and Argyropoulos (J. Agric. Food Chem. 43:1538-1544).

Component (ii)

Component (ii) is in form of one or more cross-linkers.

In one embodiment, the component (ii) comprises in one embodiment one or more cross-linkers selected from β-hydroxyalkylamide-cross-linkers and/or oxazoline-cross-linkers.

β-hydroxyalkylamide-cross-linkers is a curing agent for the acid-functional macromolecules. It provides a hard, durable, corrosion resistant and solvent resistant cross-linked polymer network. It is believed the β-hydroxyalkylamide cross-linkers cure through esterification reaction to form multiple ester linkages. The hydroxy functionality of the β-hydroxyalkylamide-cross-linkers should be an average of at least 2, preferably greater than 2 and more preferably 2-4 in order to obtain optimum curing response.

Oxazoline group containing cross-linkers are polymers containing one of more oxazoline groups in each molecule and generally, oxazoline containing cross-linkers can easily be obtained by polymerizing an oxazoline derivative. The patent U.S. Pat. No. 6,818,699 B2 provides a disclosure for such a process.

In one embodiment, the component (ii) is one or more epoxy compounds having a molecular weight of more than 500, such as an epoxidised oil based on fatty acid triglyceride or one or more flexible oligomer or polymer, such as a low Tg acrylic based polymer, such as a low Tg vinyl based polymer, such as low Tg polyether, which contains reactive functional groups such as carbodiimide groups, such as anhydride groups, such as oxazoline groups, such as amino groups, such as epoxy groups, such as β-hydroxyalkylamide groups.

In one embodiment, component (ii) is one or more cross-linkers selected from the group consisting of fatty amines.

In one embodiment, component (ii) is one or more cross-linkers in form of fatty amides.

In one embodiment, component (ii) is one or more cross-linkers selected from polyester polyols, such as polycaprolactone.

In one embodiment, component (ii) is one or more cross-linkers selected from the group consisting of starch, modified starch, CMC.

In one embodiment, component (ii) is one or more cross-linkers in form of multifunctional carbodiimides, such as aliphatic multifunctional carbodiimides.

In one embodiment, the component (ii) is one or more cross-linkers in form of aziridines, such as CX100, NeoAdd-Pax 521/523.

In one embodiment, component (ii) is one or more cross-linkers selected from melamine based cross-linkers, such as a hexakis(methylmethoxy)melamine (HMMM) based cross-linkers.

Examples of such compounds are Picassian XL 701, 702, 725 (Stahl Polymers), such as ZOLDINE® XL-29SE (Angus Chemical Company), such as CX300 (DSM), such as Carbodilite V-02-L2 (Nisshinbo Chemical Inc.).

In one embodiment, component (ii) is Primid XL552, which has the following structure:

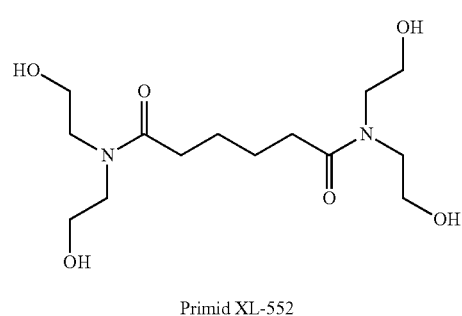 [SMILES: O=C(CCCCC(=O)N(CCO)CCO)N(CCO)CCO]

Primid XL-552

Component (ii) can also be any mixture of the above mentioned compounds.

In one embodiment, the binder composition according to the present invention comprises component (ii) in an amount of 1 to 50 wt.-%, such as 4 to 20 wt.-%, such as 6 to 12 wt.-%, based on the dry weight of component (i).

In one embodiment, component (ii) is in form of one or more cross-linkers selected from
β-hydroxyalkylamide-cross-linkers, such as N-(2-hydroxyisopropyl)amide-cross-linkers, such as N-(2-hydroxyethyl)amide-cross-linkers, such as N-(2-hydroxyethyl)adipamide-cross-linkers, such as N,N,N',N'-tetrakis(2-hydroxyethyl)adipamide and/or
the group consisting of multifunctional organic amines such as an alkanolamine, diamines, such as hexamethyldiamine, and/or
epoxy compounds having a molecular weight of more than 500, such as an epoxidised oil based on fatty acid triglyceride or one or more flexible oligomer or polymer, such as a low Tg acrylic based polymer, such as a low Tg vinyl based polymer, such as low Tg polyether, which contains reactive functional groups such as carbodiimide groups, such as anhydride groups, such as oxazoline groups, such as amino groups, such as epoxy groups, and/or
one or more cross-linkers in form of multifunctional carbodiimides, such as aliphatic multifunctional carbodiimides.

In one embodiment, component (ii) comprises one or more cross-linkers selected from
β-hydroxyalkylamide-cross-linkers, such as N-(2-hydroxyisopropyl)amide-cross-linkers, such as N-(2-hydroxyethyl)amide-cross-linkers, such as N-(2-hydroxyethyl)adipamide-cross-linkers, such as N,N,N',N'-tetrakis(2-hydroxyethyl)adipamide.

In one embodiment, component (ii) comprises component (ii) in an amount of 2 to 90 wt.-%, such as 6 to 60 wt.-%, such as 10 to 40 wt.-%, such as 25 to 40 wt.-%, based on the dry weight of component (i).

Component (iii)

Optionally, the binder composition may comprise a component (iii). Component (iii) is in form of one or more plasticizers.

In one embodiment, component (iii) is in form of one or more plasticizers selected from the group consisting of polyols, such as carbohydrates, hydrogenated sugars, such as sorbitol, erythriol, glycerol, monoethylene glycol, polyethylene glycols, polyethylene glycol ethers, polyethers, phthalates and/or acids, such as adipic acid, vanillic acid, lactic acid and/or ferullic acid, acrylic polymers, polyvinyl alcohol, polyurethane dispersions, ethylene carbonate, propylene carbonate, lactones, lactams, lactides, acrylic based polymers with free carboxy groups and/or polyurethane dispersions with free carboxy groups, polyamides, amides such as carbamide/urea, or any mixtures thereof.

In one embodiment, component (iii) is in form of one or more plasticizers selected from the group consisting of carbonates, such as ethylene carbonate, propylene carbonate, lactones, lactams, lactides, compounds with a structure similar to lignin like vanillin, acetosyringone, solvents used as coalescing agents like alcohol ethers, polyvinyl alcohol.

In one embodiment, component (iii) is in form of one or more non-reactive plasticizer selected from the group consisting of polyethylene glycols, polyethylene glycol ethers, polyethers, hydrogenated sugars, phthalates and/or other esters, solvents used as coalescing agents like alcohol ethers, acrylic polymers, polyvinyl alcohol.

In one embodiment, component (iii) is one or more reactive plasticizers selected from the group consisting of carbonates, such as ethylene carbonate, propylene carbonate, lactones, lactams, lactides, di- or tricarboxylic acids, such as adipic acid, or lactic acid, and/or vanillic acid and/or ferullic acid, polyurethane dispersions, acrylic based polymers with free carboxy groups, compounds with a structure similar to lignin like vanillin, acetosyringone.

In one embodiment, component (iii) is in form of one or more plasticizers selected from the group consisting of fatty alcohols, monohydroxy alcohols such as pentanol, stearyl alcohol.

In one embodiment, component (iii) comprises one or more plasticizers selected from the group consisting of polyethylene glycols, polyethylene glycol ethers, and/or one or more plasticizers in form of polyols, such as 1,1,1-Tris (hydroxymethyl)propane, and/or triethanolamine.

Another particular surprising aspect of the present invention is that the use of plasticizers having a boiling point of more than 100° C., in particular 140 to 250° C., strongly improves the mechanical properties of the growth substrate according to the present invention although, in view of their boiling point, it is likely that these plasticizers will at least in part evaporate during the curing of the binders in contact with the MMVF.

In one embodiment, component (iii) comprises one or more plasticizers having a boiling point of more than 100° C., such as 110 to 380° C., more preferred 120 to 300° C., more preferred 140 to 250° C.

It is believed that the effectiveness of these plasticizers in the binder composition according to the present invention is associated with the effect of increasing the mobility of the lignins during the curing process. It is believed that the increased mobility of the lignins during the curing process facilitates the effective cross-linking.

In one embodiment, component (iii) comprises one or more polyethylene glycols having an average molecular weight of 150 to 50000 g/mol, in particular 150 to 4000 g/mol, more particular 150 to 1000 g/mol, preferably 150 to 500 g/mol, more preferably 200 to 400 g/mol.

In one embodiment, component (iii) comprises one or more polyethylene glycols having an average molecular weight of 4000 to 25000 g/mol, in particular 4000 to 15000 g/mol, more particular 8000 to 12000 g/mol.

In one embodiment component (iii) is capable of forming covalent bonds with component (i) and/or component (ii) during the curing process. Such a component would not evaporate and remain as part of the composition but will be effectively altered to not introduce unwanted side effects e.g. water absorption in the cured product. Non-limiting examples of such a component are caprolactone and acrylic based polymers with free carboxyl groups.

In one embodiment, component (iii) is selected from the group consisting of fatty alcohols, monohydroxy alcohols, such as pentanol, stearyl alcohol.

In one embodiment, component (iii) is selected from one or more plasticizers selected from the group consisting of alkoxylates such as ethoxylates such as butanol ethoxylates, such as butoxytriglycol.

In one embodiment, component (iii) is selected from one or more propylene glycols.

In one embodiment, component (iii) is selected from one or more glycol esters.

In one embodiment, component (iii) is selected from one or more plasticizers selected from the group consisting of adipates, acetates, benzoates, cyclobenzoates, citrates, stearates, sorbates, sebacates, azelates, butyrates, valerates.

In one embodiment, component (iii) is selected from one or more plasticizers selected from the group consisting of phenol derivatives such as alkyl or aryl substituted phenols.

In one embodiment, component (iii) is selected from one or more plasticizers selected from the group consisting of silanols, siloxanes.

In one embodiment, component (iii) is selected from one or more plasticizers selected from the group consisting of sulfates such as alkyl sulfates, sulfonates such as alkyl aryl sulfonates such as alkyl sulfonates, phosphates such as tripolyphosphates; such as tributylphosphates.

In one embodiment, component (iii) is selected from one or more hydroxy acids.

In one embodiment, component (iii) is selected from one or more plasticizers selected from the group consisting of monomeric amides such as acetamides, benzamide, fatty acid amides such as tall oil amides.

In one embodiment, component (iii) is selected from one or more plasticizers selected from the group consisting of quaternary ammonium compounds such as trimethylglycine, distearyldimethylammoniumchloride.

In one embodiment, component (iii) is selected from one or more plasticizers selected from the group consisting of vegetable oils such as castor oil, palm oil, linseed oil, tall oil, soybean oil.

In one embodiment, component (iii) is in form of tall oil.

In one embodiment, component (iii) is selected from one or more plasticizers selected from the group consisting of hydrogenated oils, acetylated oils.

In one embodiment, component (iii) is selected from one or more fatty acid methyl esters.

In one embodiment, component (iii) is selected from one or more plasticizers selected from the group consisting of alkyl polyglucosides, gluconamides, aminoglucoseamides, sucrose esters, sorbitan esters.

In one embodiment, component (iii) is selected from the group consisting of polyethylene glycols, polyethylene glycol ethers.

In one embodiment, component (iii) is selected from the group consisting of triethanolamine.

In one embodiment, component (iii) is in form of propylene glycols, phenol derivatives, silanols, siloxanes, hydroxy acids, vegetable oils, polyethylene glycols, polyethylene glycol ethers, and/or one or more plasticizers in form of polyols, such as 1,1,1-Tris(hydroxymethyl)propane, triethanolamine, or any mixtures thereof.

It has surprisingly been found that the inclusion of plasticizers in the binder compositions according to the present invention strongly improves the mechanical properties of the growth substrate product according to the present invention.

The term plasticizer refers to a substance that is added to a material in order to make the material softer, more flexible (by decreasing the glass-transition temperature Tg) and easier to process.

Component (iii) can also be any mixture of the above mentioned compounds.

In one embodiment, component (iii) is present in an amount of 0.5 to 60, preferably 2.5 to 25, more preferably 3 to 15 wt.-%, based on the dry weight of component (i).

In one embodiment, component (iii) is present in an amount of 0.5 to 60, preferably 2.5 to 25, more preferably 3 to 15 wt.-%, based on the dry weight of components (i), (ii), and (iii).

Binder Composition Comprising Components (i) and (iia)

In one embodiment the present invention is directed at a method of growing plants in a coherent growth substrate product, the method comprising:
providing at least one coherent growth substrate product comprising man-made vitreous fibres (MMVF) bonded with a cured aqueous binder composition;
positioning one or more seeds, seedlings, cuttings or plants in contact with the growth substrate product;
irrigating the growth substrate product;
wherein the aqueous binder composition prior to curing comprises;
a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins.
a component (iia) in form of one or more modifiers,
preferably with the proviso that the aqueous binder composition does not comprise a cross-linker selected from
epoxy compounds having a molecular weight $M_w$ of 500 or less,
and/or with the proviso that the aqueous binder composition does not comprise a cross-linker selected from
carbonyl compounds selected from aldehydes, carbonyl compounds of the formula R—$[C(O)R_1]_x$
in which:
R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, $R_1$ represents a hydrogen atom or a $C_1$-$C_{10}$ alkyl radical, and x varies from 1 to 10,
and/or with the proviso that the aqueous binder composition does not comprise a cross-linker selected from
polyamines,
and/or with the proviso that the aqueous binder composition does not comprise a cross-linker selected from
mono- and oligosaccharides.

The present inventors have found that the excellent binder properties can also be achieved by a two-component system which comprises component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins and a component (iia) in form of one or more modifiers, and optionally any of the other components mentioned above and below.

In one embodiment, component (iia) is a modifier in form of one or more compounds selected from the group consisting of epoxy compounds having a molecular weight of more than 500, such as an epoxidised oil based on fatty acid triglyceride or one or more flexible oligomer or polymer, such as a low Tg acrylic based polymer, such as a low Tg vinyl based polymer, such as low Tg polyether, which contains reactive functional groups such as carbodiimide groups, such as anhydride groups, such as oxazoline groups, such as amino groups, such as epoxy groups such as β-hydroxyalkylamide groups.

In one embodiment, component (iia) is one or more modifiers selected from the group consisting of polyethylene imine, polyvinyl amine, fatty amines.

In one embodiment, the component (iia) is one or more modifiers selected from multifunctional carbodiimides, such as aliphatic multifunctional carbodiimides.

Component (iia) can also be any mixture of the above mentioned compounds.

Without wanting to be bound by any particular theory, the present inventors believe that the excellent binder properties achieved by the binder composition for MMVF comprising components (i) and (iia), and optional further components, are at least partly due to the effect that the modifiers used as components (iia) at least partly serve the function of a plasticizer and a cross-linker.

In one embodiment, the binder composition comprises component (iia) in an amount of 1 to 40 wt.-%, such as 4 to 20 wt.-%, such as 6 to 12 wt.-%, based on the dry weight of the component (i).

Further Components

In some embodiments, the binder composition according to the invention comprises further components.

In one embodiment, the binder composition comprises a catalyst selected from inorganic acids, such as sulfuric acid, sulfamic acid, nitric acid, boric acid, hypophosphorous acid, and/or phosphoric acid, and/or any salts thereof such as sodium hypophosphite, and/or ammonium salts, such as ammonium salts of sulfuric acid, sulfamic acid, nitric acid, boric acid, hypophosphorous acid, and/or phosphoric acid, and/or sodium polyphosphate (STTP), and/or sodium metaphosphate (STMP), and/or phosphorous oxychloride. The presence of such a catalyst can improve the curing properties of the binder compositions according to the present invention.

In one embodiment, the binder composition comprises a catalyst selected from Lewis acids, which can accept an electron pair from a donor compound forming a Lewis adduct, such as $ZnCl_2$, Mg $(ClO_4)_2$, Sn $[N(SO_2\text{-n-}C_8F_{17})_2]_4$.

In one embodiment, the binder composition comprises a catalyst selected from metal chlorides, such as KCl, $MgCl_2$, ZnCl$_2$, FeCl$_3$ and SnCl$_2$ or their adducts such as AlCl$_3$ adducts, such as BF$_3$ adducts, such as BF$_3$ ethylamine complex.

In one embodiment, the binder composition comprises a catalyst selected from organometallic compounds, such as titanate-based catalysts and stannum based catalysts.

In one embodiment, the binder composition comprises a catalyst selected from chelating agents, such as transition metals, such as iron ions, chromium ions, manganese ions, copper ions and/or from peroxides such as organic peroxides such as dicumyl peroxide.

In one embodiment, the binder composition according to the present invention comprises a catalyst selected from phosphites such as alkyl phosphites, such as aryl phosphites such as triphenyl phosphite.

In one embodiment, the binder composition according to the present invention comprises a catalyst selected from the group of ternary amines such as tris-2,4,6-dimethylaminomethyl phenol.

In one embodiment, the binder composition further comprises a further component (iv) in form of one or more silanes.

In one embodiment, the binder composition comprises a further component (iv) in form of one or more coupling agents, such as organofunctional silanes.

In one embodiment, component (iv) is selected from group consisting of organofunctional silanes, such as primary or secondary amino functionalized silanes, epoxy functionalized silanes, such as polymeric or oligomeric epoxy functionalized silanes, methacrylate functionalized silanes, alkyl and aryl functionalized silanes, urea funtionalised silanes or vinyl functionalized silanes.

In one embodiment, the binder composition further comprises a component (v) in form of one or more components selected from the group of bases, such as ammonia, such as alkali metal hydroxides, such as KOH, such as earth alkaline metal hydroxides, such as Ca(OH)$_2$, such as Mg(OH)$_2$, such as amines or any salts thereof.

In one embodiment, the binder composition further comprises a further component in form of urea, in particular in an amount of 5 to 40 wt.-%, such as 10 to 30 wt.-%, 15 to 25 wt.-%, based on the dry weight of component (i).

In one embodiment, the binder composition further comprises a further component in form of one or more carbohydrates selected from the group consisting of sucrose, reducing sugars, in particular dextrose, polycarbohydrates, and mixtures thereof, preferably dextrins and maltodextrins, more preferably glucose syrups, and more preferably glucose syrups with a dextrose equivalent value of DE=30 to less than 100, such as DE=60 to less than 100, such as DE=60-99, such as DE=85-99, such as DE=95-99.

In one embodiment, the binder composition further comprises a further component in form of one or more carbohydrates selected from the group consisting of sucrose and reducing sugars in an amount of 5 to 50 wt.-%, such as 5 to less than 50 wt.-%, such as 10 to 40 wt.-%, such as 15 to 30 wt.-% based on the dry weight of component (i).

In the context of the present invention, a binder composition having a sugar content of 50 wt.-% or more, based on the total dry weight of the binder components, is considered to be a sugar based binder. In the context of the present invention, a binder composition having a sugar content of less than 50 wt.-%, based on the total dry weight of the binder components, is considered a non-sugar based binder.

In one embodiment, the binder composition further comprises a further component in form of one or more surface active agents that are in the form of non-ionic and/or ionic emulsifiers such as polyoxyethylenes (4) lauryl ether, such as soy lecithin, such as sodium dodecyl sulfate.

In one embodiment, the aqueous binder composition consists essentially of
  a component (i) in form of one or more lignins selected from the group of lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins,
and/or
  a component (ii) in form of one or more cross-linkers;
  a component (iii) in form of one or more plasticizers;
  a component (iv) in form of one or more coupling agents, such as organofunctional silanes;
  optionally a component in form of one or more compounds selected from the group of bases, such as ammonia, such as alkali metal hydroxides, such as KOH, such as earth alkaline metal hydroxides, such as Ca(OH)$_2$, such as Mg(OH)$_2$, such as amines or any salts thereof;
  optionally a component in form of urea;
  optionally one or more surface active agents;
  water.

In one embodiment, the aqueous binder composition consists essentially of
  a component (i) in form of one or more lignins selected from the group of lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins,
and/or
  a component (ii) in form of one or more cross-linkers;
  a component (iv) in form of one or more coupling agents, such as organofunctional silanes;
  optionally a component in form of one or more compounds selected from the group of bases, such as ammonia, such as alkali metal hydroxides, such as KOH, such as earth alkaline metal hydroxides, such as Ca(OH)$_2$, such as Mg(OH)$_2$, such as amines or any salts thereof;
  optionally a component in form of urea;
  optionally one or more surface active agents;
  water.

The present inventors have surprisingly found that a coherent growth substrate product comprising man-made vitreous fibres (MMVF) bonded with a cured aqueous binder composition as it is described above have at a very high stability, both when freshly produced and after aging conditions.

Further, the present inventors have found that even higher product stability can be obtained by using a curing temperature of >230° C.

The present inventors have further found that the stability of the growth substrate product can be further increased by the following measures:
  Lower line capacity, meaning longer curing time
  Addition of high amounts of crosslinker
  Addition of a combination of two or more different crosslinkers
  Addition of small amounts of cationic species such as multivalent metal ions such as calcium and/or organic cationic species such as amines and/or organically modified inorganic compounds such as amine modified montmorillonite clays.

The growth substrate product according to the invention may optionally comprise a wetting agent. A wetting agent has its normal meaning in the art, and may be a cationic, anionic or non-ionic surfactant.

The growth substrate product may comprise a non-ionic wetting agent such as Rewopal®.

The growth substrate product may comprise an ionic surfactant, more preferably an alkyl ether sulphate surfactant wetting agent. The wetting agent may be an alkali metal alkyl ether sulphate or an ammonium alkyl ether sulphate. Preferably the wetting agent is a sodium alkyl ether sulphate. Alkyl ether sulphate surfactant wetting agents are commercially available. The wetting agent may also be a linear alkyl benzene sulphonate anionic surfactant.

Some non-ionic wetting agents may be washed out of the MMVF substrate over time. It is therefore preferable to use an ionic wetting agent, especially an anionic wetting agent, such as linear alkyl benzene sulphonate.

Preferably the growth substrate product comprises 0.01 to 1 wt % wetting agent, preferably 0.05 to 0.5 wt % wetting agent, more preferably 0.1 to 0.3 wt % wetting agent.

However, the inventors discovered that a wetting agent is not essential for the growth substrate product according to the invention. This is believed to be due to the nature of the binder composition. Therefore, preferably the growth substrate does not comprise any wetting agent. By this, it is meant that the growth substrate preferably comprises no wetting agent i.e. comprises 0 wt % wetting agent.

This has several advantages. Firstly, it reduces the number of additives in the growth substrate product which is environmentally advantageous, and also saves costs. Often wetting agents are made from non-renewable sources so it is beneficial to avoid their use. Additionally, wetting agents may be washed out of the growth substrate product. This is problematic because the wetting agent may contaminate the water supply and must be properly disposed of in line with environmental regulations. When a wetting agent is washed out this also changes the nature of the growth substrate product, which can lead to inconsistencies in the growing process. Furthermore, wetting agents have the disadvantage that they can cause foam to be released from the product during use. Avoiding the use of a wetting agent avoids these problems.

The hydrophilicity of a sample of MMVF substrate can be measured by determining the sinking time of a sample. A sample of MMVF substrate having dimensions of 100×100×65 mm is required for determining the sinking time. A container with a minimum size of 200×200×200 mm is filled with water. The sinking time is the time from when the sample first contacts the water surface to the time when the test specimen is completely submerged. The sample is placed in contact with the water in such a way that a cross-section of 100×100 mm first touches the water. The sample will then need to sink a distance of just over 65 mm in order to be completely submerged. The faster the sample sinks, the more hydrophilic the sample is. The MMVF substrate is considered hydrophilic if the sinking time is less than 120 s. Preferably the sinking time is less than 60 s. In practice, the MMVF substrate may have a sinking time of a few seconds, such as less than 10 seconds.

The hydrophilicity of the growth substrate product may be defined in terms of the contact angle with water. Preferably, the MMVF of the growth substrate product has a contact angle with water of less than 90°. The contact angle is measured by a sessile drop measurement method. Any sessile drop method can be used, for example with a contact angle goniometer. In practice, a droplet is placed on the solid surface and an image of the drop is recorded in time. The static contact angle is then defined by fitting Young-Laplace equation around the droplet. The contact angle is given by the angle between the calculated drop shape function and the sample surface, the projection of which in the drop image is referred to as the baseline. The equilibrium contact angles are used for further evaluation and calculation of the surface free energy using the Owens, Wendt, Rabel and Kaeble method. The method for calculating the contact angle between material and water is well-known to the skilled person.

The growth substrate product preferably has a density in the range of 40 to 100 kg/m$^3$, more preferably 45 to 80 kg/m$^3$. This density range was found to be optimal for root growth and product handling, allowing the roots to penetrate and ensuring that the product is not damaged during handling.

The at least one coherent layer generally has a loss on ignition (LOI) within the range of 0.3 to 18.0%, preferably 0.5 to 8.0%.

Preferably the growth substrate comprises 1.0 wt % to 6.0 wt % of the cured binder composition, preferably 2.0 wt % to 4.5 wt %, most preferably 2.5 wt % to 3.5 wt % based on the weight of the growth substrate. Determination of binder content is performed according to DS/EN13820:2003. The binder content is taken as the loss on ignition. The binder content includes any binder additives.

The growth substrate product preferably has a volume in the range 0.003 to 87 litres, such as 0.005 to 30 litres, preferably 0.008 to 20 litres. The growth substrate product may be in the form of a product conventionally known as a plug, or in the form of a product conventionally known as a block or cube, or in the form of a product conventionally known as a slab.

Preferably, the growth substrate product has a height in the range of 10 mm to 200 mm.

The growth substrate product may have dimensions conventional for the product type commonly known as a plug. Thus it may have height from 20 to 35 mm, often 25 to 28 mm, and length and width in the range 15 to 25 mm, often around 20 mm. In this case the substrate is often substantially cylindrical with the end surfaces of the cylinder forming the top and bottom surfaces of the growth substrate.

The volume of the growth substrate product in the form of a plug is preferably not more than 150 cm$^3$. In general the volume of the growth substrate product in the form of a plug is in the range 3 to 150 cm$^3$ and preferably not more than 100 cm$^3$, more preferably not more than 80 cm$^3$, in particular not more than 75 cm$^3$, most preferably not more than 70 cm$^3$. The minimum distance between the top and bottom surfaces of a plug is preferably less than 60 mm, more preferably less than 50 mm and in particular less than 40 mm or less.

Another embodiment of a plug has height from 30 to 50 mm, often around 40 mm and length and width in the range 20 to 40 mm, often around 30 mm. The growth substrate in this case is often of cuboid form. In this first case the volume of the growth substrate is often not more than 50 cm$^3$, preferably not more than 40 cm$^3$.

The growth substrate may be of the type of plug described as the first coherent MMVF growth substrate in our publication WO2010/003677. In this case the volume of the growth substrate product is most preferably in the range to 10 to 40 cm$^3$.

The growth substrate product may have dimensions conventional for the product type commonly known as a block or cube. Thus it may have height from 5 to 20 cm, often 6 to 15 cm, and length and width in the range 4 to 30 cm, often 10 to 20 cm. In this case the substrate is often substantially cuboidal. The volume of the growth substrate product in the form of a block is preferably in the range 64 to 8000 cm$^3$.

The growth substrate product may have dimensions conventional for the product type commonly known as a slab. Thus it may have height from 5 to 15 cm, often 7.5 to 12.5 cm, preferably 7.5 to 10 cm, a width in the range of 5 to 30 cm, often 12 to 24 cm, and a length in the range 30 to 240 cm, often 40 to 200 cm. In this case the substrate is often substantially cuboidal. The volume of the growth substrate product in the form of a slab is preferably in the range 750 to 86,400 cm$^3$.

The growth substrate product may have a volume in the range 3 to 300 cm$^3$. It may be a cube with dimensions of 4 cm by 4 cm by 4 cm. The growth substrate product may be also cylindrical. Preferably it has a length 50 mm and a diameter or 46 mm, or a length of 40 mm and a diameter of 36 mm, or a length of 27 mm and a diameter of 22 mm.

In general, the growth substrate product may be of any appropriate shape including cylindrical, cuboidal and cubic. Usually the top and bottom surfaces are substantially planar.

In the present invention, the term "height" means the distance from the bottom surface to the top surface when the substrate is in use. The top surface is the surface that faces upwardly when the product is positioned as intended to be used and the bottom surface is the surface that faces downwardly (and on which the product rests) when the product is positioned as intended to be used. The term "length" means the longest distance between two sides i.e. the distance from one end to the other end when the substrate is in use. The term "width" is the distance between two sides, perpendicular to the length. These terms have their normal meaning in the art.

The growth substrate product according to the invention may have a seed hole. Alternatively, it may not have a seed hole. The term seed hole has its normal meaning in the art, and can also be called a plant hole or cavity. A seed hole is an indentation in the top surface of a growth substrate, into which a seed, seedling, cutting or plant is placed. The seed hole may be any suitable shape, such as cylindrical or conical.

Preferably, the growth substrate product comprises a liquid impermeable covering surrounding at least the side surfaces of the substrate. Preferably the liquid impermeable covering is plastic. The growth substrate product may comprise a liquid impermeable covering encasing the entire substrate, wherein the covering has at least one opening for a drain hole and at least one opening on the upper surface to allow contact between the growth substrate and a further growth substrate.

The terms seed, seedling, cutting and plant have their normal meaning in the art. The seeds, seedlings, cuttings and plants may be that of cucumbers, tomatoes, eggplant, sweet peppers, strawberries, lettuce, perennial plants such as roses; gerberas or medicinal cannabis.

In the present invention, the seed, seedling, cutting or plant is placed in contact with the growth substrate product. This means that the seed, seedling, cutting or plant may be placed directly into the substrate, for example into a seed hole. Alternatively it can be positioned such that it grows into the substrate, for example from a further growth substrate. Any part of the seed, seedling, cutting or plant may be in contact with any part of the growth substrate product.

In the method of the present invention, the growth substrate product is irrigated. Preferably it is irrigated with water and nutrients. This can be done using any of the methods known to the skilled person.

The present invention also relates to a coherent growth substrate product comprising man-made vitreous fibres (MMVF) bonded with a cured binder composition free of phenol and formaldehyde, wherein the binder composition prior to curing comprises:
 a component (i) in form of one or more lignosulfonate lignins having a carboxylic acid group content of 0.03 to 1.4 mmol/g, based on the dry weight of the lignosulfonate lignins,
 a component (ii) in form of one or more cross-linkers.

The coherent growth substrate product is as described above. This embodiment may have any of the additional features described above for the method of the invention.

The present invention also relates to an array of two or more coherent growth substrate products, wherein the coherent growth substrate products comprise man-made vitreous fibres (MMVF) bonded with a cured binder composition free of phenol and formaldehyde, wherein the binder composition prior to curing comprises:
 a component (i) in form of one or more lignosulfonate lignins having a carboxylic acid group content of 0.03 to 1.4 mmol/g, based on the dry weight of the lignosulfonate lignins,
 a component (ii) in form of one or more cross-linkers.

In this embodiment, one or more of the coherent growth substrate products may have any of the additional features described above for the method of the invention.

In the array according to the invention, the at least two coherent growth substrate product may be identical. For example, it may be two identical coherent growth substrate products positioned beside each other. Alternatively, the at least two growth substrate products may not be identical.

Preferably, the array comprises one growth substrate product positioned in contact with the second growth substrate product. Preferably, one growth substrate is positioned on the top surface of the second growth substrate, for example in a plug/block,block/slab, block/block, plug/block/slab or plug/block/block arrangement. In a plug/block arrangement, a substrate described as a plug above is positioned in contact with a substrate described as a block above. For example, the plug may be inserted into a cavity in the block. In a block/slab arrangement, a substrate described as a block above is positioned in contact with a substrate described as a slab above. For example, the block is positioned on the top surface of the slab. In a block, block arrangement a block is positioned in contact with another block, for example, it may be positioned on the top surface of the other block. In a plug, block, slab arrangement, a plug is positioned in contact with a block, which in turn is positioned in contact with a slab. This is analogous for a plug/block/block arrangement: a plug is positioned in contact with another block, which in turn is positioned in contact with a block.

The present invention is also directed to use of a coherent growth substrate product for growing plants, wherein the coherent growth substrate product comprises man-made vitreous fibres (MMVF) bonded with a cured aqueous binder composition free of phenol and formaldehyde, wherein the binder composition prior to curing comprises:
 a component (i) in form of one or more lignosulfonate lignins having a carboxylic acid group content of 0.03 to 1.4 mmol/g, based on the dry weight of the lignosulfonate lignins,
 a component (ii) in form of one or more cross-linkers.

The coherent growth substrate product is as described above. This embodiment may have any of the additional features described above for the method of the invention.

The present invention also relates to a method of making a growth substrate product comprising the steps of:
(i) providing MMVF;
(ii) spraying the MMVF with an aqueous binder composition free of phenol and formaldehyde;
(iii) collecting and consolidating the MMVF; and
(iv) curing the aqueous binder composition;
wherein the aqueous binder composition prior to curing comprises
 a component (i) in form of one or more lignosulfonate lignins having a carboxylic acid group content of 0.03 to 1.4 mmol/g, based on the dry weight of the lignosulfonate lignins,
 a component (ii) in form of one or more cross-linkers.

The coherent growth substrate product is as described above. This embodiment of the invention may have any of the additional features described above for the method of the invention or growth substrate of the invention.

Man-made vitreous fibres (MMVF) can be provided by any known method. MMVF can be made from a mineral melt. A mineral melt is provided in a conventional manner by providing mineral materials and melting them in a furnace. This furnace can be any of the types of furnace known for production of mineral melts for MMVF, for instance a shaft furnace such as a cupola furnace, a tank furnace, an electric furnace or a cyclone furnace.

Any suitable method may be employed to form MMVF from the mineral melt by fiberization. The fiberization can be by a spinning cup process in which melt is centrifugally extruded through orifices in the walls of a rotating cup (spinning cup or a fiberizing disc, also known as internal centrifugation). Alternatively the fiberization can be by centrifugal fiberization by projecting the melt onto and spinning off the outer surface of one fiberizing rotor, or off a cascade of a plurality of fiberizing rotors, which rotate about a substantially horizontal axis (cascade spinner).

The melt is thus formed into a cloud of fibres entrained in air and the fibres are collected as a web on a conveyor and carried away from the fiberizing apparatus. The web of fibres is then consolidated, which can involve cross-lapping and/or longitudinal compression and/or vertical compression and/or winding around a mandrel to produce a cylindrical product for pipe insulation. Other consolidation processes may also be performed.

The binder composition is applied to the fibres preferably when they are a cloud entrained in air. Alternatively it can be applied after collection on the conveyor but this is less preferred.

Generally, the binder is sprayed immediately after fibrillation of the mineral melt on to the air-borne mineral fibres. The aqueous binder composition is normally applied in an amount of 0.1 to 18%, preferably 0.2 to 8% by weight, of the bonded MMVF product on a dry basis.

After consolidation the consolidated web of fibres is preferably passed into a curing device to cure the binder. The spray-coated mineral fibre web is generally cured in a curing oven by means of a hot air stream. The hot air stream may be introduced into the mineral fibre web from below, or above or from alternating directions in distinctive zones in the length direction of the curing oven. The web is cured by a chemical and/or physical reaction of the binder components.

In one embodiment, the curing is carried out at temperatures from 100 to 300° C., such as 170 to 270° C., such as 180 to 250° C., such as 190 to 230° C. Preferably the step of curing occurs at a curing temperature of >230° C. is used.

The present inventors have found that even higher product stability can be obtained by using a curing temperature of >230° C.

In a preferred embodiment, the curing takes place in a conventional curing oven for mineral wool production, preferably operating at a temperature of from 150 to 300° C., such as 170 to 270° C., such as 180 to 250° C., such as 190 to 230° C.

In one embodiment, the curing takes place for a time of 30 seconds to 20 minutes, such as 1 to 15 minutes, such as 2 to 10 minutes.

The curing process may commence immediately after application of the binder to the fibres. The curing is defined as a process whereby the binder composition undergoes a physical and/or chemical reaction which in case of a chemical reaction usually increases the molecular weight of the compounds in the binder composition and thereby increases the viscosity of the binder composition, usually until the binder composition reaches a solid state. The cured binder composition binds the fibres to form a structurally coherent matrix of fibres.

In a one embodiment, the curing of the binder in contact with the mineral fibres takes place in a heat press.

The curing of a binder in contact with the mineral fibres in a heat press has the particular advantage that it enables the production of high-density products.

In one embodiment the curing process comprises drying by pressure. The pressure may be applied by blowing air or gas through/over the mixture of mineral fibres and binder.

The present invention also relates to the use of a lignin component in form of one or more lignosulfonate lignins having a carboxylic acid group content of 0.03 to 1.4 mmol/g, based on the dry weight of the lignosulfonate lignins, for the preparation of a binder composition free of phenol and formaldehyde for a coherent growth substrate product comprising man-made vitreous fibres (MMVF).

In one embodiment, the binder composition is free of phenol and formaldehyde.

In one embodiment, the present invention is directed to the use of a lignin component in the form of one or more lignosulfonate lignins having the features of component (i) described above for the preparation of a binder composition, preferably free of phenol and formaldehyde, for a coherent growth substrate product comprising man-made vitreous fibres (MMVF), whereby this binder composition further comprises components (ii) and optionally (iii) as defined above, preferably with the proviso that the aqueous binder composition does not comprise a cross-linker selected from
 epoxy compounds having a molecular weight $M_w$ of 500 or less
and/or
with the proviso that the aqueous binder composition does not comprise a cross-linker selected from
 carbonyl compounds selected from aldehydes, carbonyl compounds of the formula $R-[C(O)R_1]_x$
in which:
R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups,
$R_1$ represents a hydrogen atom or a $C_1$-$C_{10}$ alkyl radical, and
x varies from 1 to 10 and/or with the proviso that the aqueous binder composition does not comprise a cross-linker selected from
    polyamines
and/or
with the proviso that the aqueous binder composition does not comprise a cross-linker selected from
    mono- and oligosaccharides.

In one embodiment, the present invention is directed to the use of a lignin component in form of one or more lignosulfonate lignins having the features of component (i) described above for the preparation of a binder composition, preferably free of phenol and formaldehyde, whereby the binder composition further comprises component (iia) as defined above.

EXAMPLES

In the following examples, several binders which fall under the definition of the present invention were prepared and compared to binders according to the prior art. The following properties were determined for the binders according to the present invention and the binders according to the prior art, respectively:

Binder Component Solids Content

The content of each of the components in a given binder solution before curing is based on the anhydrous mass of the components.

Lignosulfonates were supplied by Borregaard, Norway and LignoTech, Florida as liquids with approximately 50% solid content. Primid XL552 was supplied by EMS-CHEMIE AG, Silane (Momentive VS-142 40% activity), was supplied by Momentive and was calculated as 100% for simplicity. NH4OH 24.7% was supplied by Univar and used in supplied form. PEG 200, urea, KOH pellets, 1,1,1 tris(hydroxymethyl)propane were supplied by Sigma-Aldrich and were assumed anhydrous for simplicity.

Binder Solids

The content of binder after curing is termed "binder solids".

Disc-shaped stone wool samples (diameter: 5 cm; height 1 cm) were cut out of stone wool and heat-treated at 580° C. for at least 30 minutes to remove all organics. The solids of the binder mixture was measured by distributing a sample of the binder mixture (approx. 2 g) onto a heat treated stone wool disc in a tin foil container. The weight of the tin foil container containing the stone wool disc was weighed before and directly after addition of the binder mixture. Two such binder mixture loaded stone wool discs in tin foil containers were produced and they were then heated at 200° C. for 1 hour. After cooling and storing at room temperature for 10 minutes, the samples were weighed and the binder solids was calculated as an average of the two results.

A binder with a desired binder solids could then be produced by diluting with the required amount of water and 10% aq. silane (Momentive VS-142).

Example 1: Phytotoxicity

The phytotoxicity of a binder according to the invention was compared to a PUF binder. Each binder was diluted in a nutrient solution to various concentrations. These solutions were then used to grow plants. The results are shown below in Table 1.

In this test, the length of the first two leaves of the seedlings were measured. The length of this leaf pair is called the cotyledon leaf length. A reference without addition of binder was measured and set on 100%. If the added binder reduces the plant growth, the length of the leaf pair will be less, and the reduction in length is then calculated (see column growth inhibition).

The binder of the invention (Binder 1) was made as follows:

600.0 kg of ammonium lignosulfonate was placed in a mixing vessel to which 8.0 litres NH$_4$OH (24.7%) was added and stirred. Afterwards, 190 kg Primid XL552 solution (pre-made 31 wt % solution in water) and 68 kg PEG 200 (100% solids) were added and mixed followed by addition of 11 kg Silane (Momentive VS-142 40% activity, 10% in water).

The Comparative Binder 1, PUF binder, was made as follows:

A phenol-formaldehyde resin is prepared by reacting 37% aq. formaldehyde (606 g) and phenol (189 g) in the presence of 46% aq. potassium hydroxide (25.5 g) at a reaction temperature of 84° C. preceded by a heating rate of approximately 1° C. per minute. The reaction is continued at 84° C. until the acid tolerance of the resin is 4 and most of the phenol is converted. Urea (241 g) is then added and the mixture is cooled.

The acid tolerance (AT) expresses the number of times a given volume of a binder can be diluted with acid without the mixture becoming cloudy (the binder precipitates). Sulfuric acid is used to determine the stop criterion in a binder production and an acid tolerance lower than 4 indicates the end of the binder reaction.

To measure the AT, a titrant is produced from diluting 2.5 ml conc. sulfuric acid (>99%) with 1 L ion exchanged water. 5 mL of the binder to be investigated is then titrated at room temperature with this titrant while keeping the binder in motion by manually shaking it; if preferred, use a magnetic stirrer and a magnetic stick. Titration is continued until a slight cloud appears in the binder, which does not disappear when the binder is shaken.

The acid tolerance (AT) is calculated by dividing the amount of acid used for the titration (mL) with the amount of sample (mL):

$$AT = (\text{Used titration volume (mL)})/(\text{Sample volume (mL)})$$

Using the urea-modified phenol-formaldehyde resin obtained, a binder is made by addition of 25% aq. ammonia (90 mL) and ammonium sulfate (13.2 g) followed by water (1.30 kg).

The binder solids were then measured as described above and the mixture was diluted with the required amount of water and silane (15% binder solids solution, 0.5% silane of binder solids).

TABLE 1

| Product | Concentration % | rel. Cot. leaf length % | Growth inhibition <=20% | pH |
|---|---|---|---|---|
| PUF | 6 | 0.0 | 100.0% | 9.00 |
|  | 4 | 0.0 | 100.0% | 8.91 |
|  | 0.4 | 83.9 | 16.1% | 7.12 |
|  | 0.04 | 96.7 | 3.3% | 5.92 |

TABLE 1-continued

| Product | Concentration % | rel. Cot. leaf length % | Growth inhibition <=20% | pH |
|---|---|---|---|---|
| Binder 1 | 6 | 89.0 | 11.0% | 7.78 |
| | 4 | 89.8 | 10.2% | 7.39 |
| | 0.4 | 94.2 | 5.8% | 6.14 |
| | 0.04 | 97.3 | 2.7% | 5.67 |
| Blanco | 0.00 | | | 5.50 |

Regarding phytotoxicity, growth on all tested dilutions of the invention were better than for the PUF binder.

As can be seen from Table 1, the pH values of the binder composition of the invention are closer to a neutral value or acidic in comparison with the PUF binder. This is beneficial for plant growth as a pH value of neutral or slightly acidic is best. A basic pH value is undesirable for plant growth. It can be seen that the pH values of the PUF binder are higher than those of the binder according to the invention.

The higher the concentration of binder, the more growth inhibition. For example at 4% PUF the growth inhibition is 100%, so the plant did not germinate. At 4% of Binder 1 the growth inhibition is 10.2% which means that the length of the leaf pair is 89.8% of the reference plant leaf length: a major improvement compared to PUF.

Phytotoxicity at higher concentrations is lower for the binder of the invention. At both 6% and 4% dilution, growth was observed. However, the PUF binder shows no growth at all for these dilutions.

Even for lower concentrations, the binder of the invention performs better compared to the PUF binder.

Example 2: Water Absorption

Water absorption was measured in accordance with EN1609:2013 for four different binder compositions, as shown in Table 2 below. The testing was performed using four individual test specimens in 200×200 mm in full product thickness to get one result Comparative Binder 1, a PUF binder, was made as described above for Example 1.

Comparative Binder 2 was made as follows:

3267 kg of water is charged in 6000 l reactor followed by 287 kg of ammonia water (24.7%). Then 1531 kg of Lignin UPM BioPiva 100 is slowly added over a period of 30 min to 45 min. The mixture is heated to 40° C. and kept at that temperature for 1 hour. After 1 hour a check is made on insolubilized lignin. This can be made by checking the solution on a glass plate or a Hegman gauge. Insolubilized lignin is seen as small particles in the brown binder. During the dissolution step will the lignin solution change color from brown to shiny black. After the lignin is completely dissolved, 1 liter of a foam dampening agent (Skumdæmper 11-10 from NCÅ-Verodan) is added. Temperature of the batch is maintained at 40° C. Then addition of 307.5 kg 35% hydrogen peroxide is started. The hydrogen peroxide is dosed at a rate of 200-300 l/h. First half of the hydrogen peroxide is added at a rate of 200 l/h where after the dosage rate is increased to 300 l/h.

During the addition of hydrogen peroxide is the temperature in the reaction mixture controlled by heating or cooling in such a way that a final reaction temperature of 65° C. is reached.

The final product was analysed for the COOH group content, dry solid matter, pH, viscosity and remaining $H_2O_2$·60 g of this oxidized lignin (18.2% solids) was mixed with 1.4 g Primid XL552 (100% solids) and 2.8 g PEG200 (100% solids). 0.6 g Silane (Momentive VS-142 40% activity, 10% in water) and 17.4 g water were added and mixed to yield 15% solids.

Binder 1, according to the invention, is as described above under Example 1.

Binder 2, according to the invention, was made as follows:

730.0 kg of ammonium lignosulfonate was placed in a mixing vessel to which 8.5 l NH4OH (24.7%) was added and stirred. Afterwards, 151 kg Primid XL552 solution (pre-made 31 wt % solution in water) and 43 kg PEG 200 (100% solids) were added and mixed followed by addition of 13 kg Silane (Momentive VS-142 40% activity, 10% in water).

The results are shown below in Table 2.

As can be seen from Table 2, the water absorption for binders according to the invention is significantly higher than for the PUF binder or for the comparative lignin-based formaldehyde free binder.

TABLE 2

| Binder | water abs kg/m2 24 h |
|---|---|
| Comparative Binder 1 (PUF) | 0.10 |
| Comparative Binder 2 (lignin based Formaldehyde free) | 0.20 |
| Binder 1 | 0.60 |
| Binder 2 | 0.70 |

Example 3: Wet Strength

Wet strength was determined by submerging bars into water for four days at room temperature. The strength is measured within 20 minutes after taking out the bars from the water.

The bars were made as follows. For each binder, 16 bars were manufactured from a mixture of the binder and stone wool shots from the stone wool spinning production.

A sample of this binder solution having 15% dry solid matter (16.0 g) was mixed well with shots (80.0 g). The resulting mixture was then filled into four slots in a heat resistant silicone form for making small bars (4×5 slots per form; slot top dimension: length=5.6 cm, width=2.5 cm; slot bottom dimension: length=5.3 cm, width=2.2 cm; slot height=1.1 cm). The mixtures placed in the slots were then pressed with a suitably sized flat metal bar to generate even bar surfaces. 16 bars from each binder were made in this fashion. The resulting bars were then cured typically at 225° C. The curing time was 1 h. After cooling to room temperature, the bars were carefully taken out of the containers.

The bars were broken in a 3 point bending test (test speed: 10.0 mm/min; rupture level: 50%; nominal strength: 30 N/mm2; support distance: 40 mm; max deflection 20 mm; nominal emodule 10000 N/mm2) on a Bent Tram machine to investigate their mechanical strengths. The bars were placed with the "top face" up (i.e. the face with the dimensions length=5.6 cm, width=2.5 cm) in the machine.

The binder according to the invention, Binder 2, is as described above for Example 2.

Comparative Binder 3 was made as follows:

A mixture of 75.1% aq. glucose syrup (19.98 g; thus efficiently 15.0 g glucose syrup), 50% aq. hypophosphorous acid (0.60 g; thus efficiently 0.30 g, 4.55 mmol hypophosphorous acid) and sulfamic acid (0.45 g, 4.63 mmol) in water (30.0 g) was stirred at room temperature until a clear solution was obtained.

28% aq. ammonia (0.80 g; thus efficiently 0.22 g, 13.15 mmol ammonia) was then added dropwise until pH=7.9. The binder solids was then measured (21.2%).

The binder mixture was diluted with water (0.403 g/g binder mixture) and 10% aq. silane (0.011 g/g binder mixture, Momentive VS-142). The final binder mixture for mechanical strength studies had pH=7.9.

Comparative Binder 1, the PUF binder, was made as described above for Example 1.

The results are shown in Table 3. As can be seen from Table 3, the wet strength of the binder according to the invention (Binder 2) was slightly lower than that of PUF, but higher than that of a comparative formaldehyde-free binder.

TABLE 3

| Binder | Binder 2 | Comparative Binder 3 (sugar-based formaldehyde free) | Comparative Binder 1 (PUF) |
|---|---|---|---|
| wet strength | 0.18 ± 0.04 | 0.15 ± 0.02 | 0.23 ± 0.08 |

Example 4: Delamination Strength

The delamination strength after aging was measured in accordance with EN1607:2013. Aging of the MMVF test specimens was achieved exposing them to heat-moisture action for 7 days at 70±2° C. and 95±5% relative humidity in climatic chamber.

Three different binders were tested.

Comparative Binder 1 is as described above for Example 1. It is a PUF binder.

Comparative Binder 3 is as described above. It is a sugar-based binder.

Binder 2 is according to the invention, as described above.

The results are shown below in Table 4. As can be seen from Table 4, the delamination strength in percentage after 28 days for the product with the binder of the invention (Binder 2) is improved in comparison to another formaldehyde-free binder (Comparative Binder 3) and similar to that of PUF (Comparative Binder 1).

TABLE 4

| | delamination in % of initial | | | |
|---|---|---|---|---|
| | 0 | 7 | 14 | 28 |
| Comparative Binder 1 (PUF) | 100 | 67.1 | 64.7 | 62.0 |
| Comparative Binder 3 | 100 | 54.2 | 55.0 | 45.8 |
| Binder 2 | 100 | 70.8 | 66.7 | 57.7 |

Example 5

Mechanical Strength Studies

Bar Tests

The mechanical strength of the binders was tested in a bar test. For each binder, 16 bars were manufactured from a mixture of the binder and stone wool shots from the stone wool spinning production.

A sample of this binder solution having 15% dry solid matter (16.0 g) was mixed well with shots (80.0 g). The resulting mixture was then filled into four slots in a heat resistant silicone form for making small bars (4×5 slots per form; slot top dimension: length=5.6 cm, width=2.5 cm; slot bottom dimension: length=5.3 cm, width=2.2 cm; slot height=1.1 cm). The mixtures placed in the slots were then pressed with a suitably sized flat metal bar to generate even bar surfaces. 16 bars from each binder were made in this fashion. The resulting bars were then cured typically at 225° C. The curing time was 1 h. After cooling to room temperature, the bars were carefully taken out of the containers. Five of the bars were aged in a water bath at 80° C. for 3 h. This method of curing the prepared bars was used for example in Tables 1.1, 1.2, 1.4, 1.5, 1.6. Results in Table 1.3 are based on a slightly different method which includes a preconditioning step of 2 h at 90° C., followed by curing for 1 h at 225° C. while the remaining of the procedure is the same.

After drying for 3 days, the aged bars as well as five unaged bars were broken in a 3 point bending test (test speed: 10.0 mm/min; rupture level: 50%; nominal strength: 30 N/mm$^2$; support distance: 40 mm; max deflection 20 mm; nominal e-module 10000 N/mm$^2$) on a Bent Tram machine to investigate their mechanical strengths. The bars were placed with the "top face" up (i.e. the face with the dimensions length=5.6 cm, width=2.5 cm) in the machine.

Binder Example, Reference Binder
(Phenol-Formaldehyde Resin Modified with Urea, a PUF-Resol)

This binder is a phenol-formaldehyde resin modified with urea, a PUF-resol.

A phenol-formaldehyde resin is prepared by reacting 37% aq. formaldehyde (606 g) and phenol (189 g) in the presence of 46% aq. potassium hydroxide (25.5 g) at a reaction temperature of 84° C. preceded by a heating rate of approximately 1° C. per minute. The reaction is continued at 84° C. until the acid tolerance of the resin is 4 and most of the phenol is converted. Urea (241 g) is then added and the mixture is cooled. The acid tolerance (AT) expresses the number of times a given volume of a binder can be diluted with acid without the mixture becoming cloudy (the binder precipitates). Sulfuric acid is used to determine the stop criterion in a binder production and an acid tolerance lower than 4 indicates the end of the binder reaction.

To measure the AT, a titrant is produced from diluting 2.5 ml conc. sulfuric acid (>99%) with 1 L ion exchanged water. 5 mL of the binder to be investigated is then titrated at room temperature with this titrant while keeping the binder in motion by manually shaking it; if preferred, use a magnetic stirrer and a magnetic stick. Titration is continued until a slight cloud appears in the binder, which does not disappear when the binder is shaken.

The acid tolerance (AT) is calculated by dividing the amount of acid used for the titration (mL) with the amount of sample (mL):

AT=(Used titration volume (mL))/(Sample volume (mL))

Using the urea-modified phenol-formaldehyde resin obtained, a binder is made by addition of 25% aq. ammonia (90 mL) and ammonium sulfate (13.2 g) followed by water (1.30 kg).

The binder solids were then measured as described above and the mixture was diluted with the required amount of water and silane for mechanical measurements (15% binder solids solution, 0.5% silane of binder solids).

Binder Example, Reference Binder (Binder Based on Alkali Oxidized Lignin)

3267 kg of water is charged in 6000 l reactor followed by 287 kg of ammonia water (24.7%). Then 1531 kg of Lignin UPM BioPiva 100 is slowly added over a period of 30 min to 45 min. The mixture is heated to 40° C. and kept at that temperature for 1 hour. After 1 hour a check is made on insolubilized lignin. This can be made by checking the solution on a glass plate or a Hegman gauge. Insolubilized lignin is seen as small particles in the brown binder. During the dissolution step will the lignin solution change color from brown to shiny black. After the lignin is completely dissolved, 1 liter of a foam dampening agent (Skumdæmper 11-10 from NCÅ-Verodan) is added. Temperature of the batch is maintained at 40° C. Then addition of 307.5 kg 35% hydrogen peroxide is started. The hydrogen peroxide is dosed at a rate of 200-300 l/h. First half of the hydrogen peroxide is added at a rate of 200 l/h where after the dosage rate is increased to 300 l/h.

During the addition of hydrogen peroxide is the temperature in the reaction mixture controlled by heating or cooling in such a way that a final reaction temperature of 65° C. is reached.

The final product was analysed for the COOH group content, dry solid matter, pH, viscosity and remaining $H_2O_2$. 60 g of this oxidized lignin (18.2% solids) was mixed with 1.4 g Primid XL552 (100% solids) and 2.8 g PEG200 (100% solids). 0.6 g Silane (Momentive VS-142 40% activity, 10% in water) and 17.4 g water were added and mixed to yield 15% solids and then used for test of mechanical properties in bar tests.

Binder Compositions According to the Present Invention

In the following, the entry numbers of the binder example correspond to the entry numbers used in Table 1-1 to 1-6.

The carboxylic acid group content of all lignosulfonates used for the binders according to the present invention was measured using $^{31}P$ NMR and was found to be in the range of 0.05 to 0.6 mmol/g, based on the dry weight of the lignosulfonate lignins, for all examples.

Example 2

To 30.0 g lignosulfonate solution (50% solids), 0.4 g NH4OH (24.7%) was added and mixed followed by addition of 1.9 g Primid XL552 (100% solids) and mixing. Finally, 0.7 g Silane (Momentive VS-142 40% activity, 10% in water) and 64.3 g water were added and mixed to yield 15% solids and then used for test of mechanical properties in bar tests.

Example 11

To 30.0 g lignosulfonate solution (50% solids), 0.4 g NH4OH (24.7%) was added and mixed followed by addition of 2.1 g Primid XL552 (100% solids) and 3.4 g PEG 200 (100% solids) and mixing. Finally, 0.7 g Silane (Momentive VS-142 40% activity, 10% in water) and 61.8 g water were added and mixed to yield 15% solids and then used for test of mechanical properties in bar tests.

Example 15

To 30.0 g lignosulfonate solution (50% solids), 0.4 g NH4OH (24.7%) was added and mixed followed by addition of 2.9 g Primid XL552 (100% solids) and 3.4 g PEG 200 (100% solids) and mixing. Finally, 0.8 g Silane (Momentive VS-142 40% activity, 10% in water) and 67 g water were added and mixed to yield 15% solids and then used for test of mechanical properties in bar tests.

Example 30

To 30.0 g lignosulfonate solution (50% solids), 0.4 g $NH_4OH$ (24.7%) was added and mixed followed by addition of 2.9 g Primid XL552 (100% solids) and 3.4 g 1,1,1 tris(hydroxymethyl)propane (100% solids) and mixing. Finally, 0.8 g Silane (Momentive VS-142 40% activity, 10% in water) and 67 g water were added and mixed to yield 15% solids and then used for test of mechanical properties in bar tests.

Example 33

To 100.0 g lignosulfonate solution (50% solids), 0.3 g KOH in pellet form was added and mixed followed by addition of 10.8 g Primid XL552 (100% solids) and 11.3 g PEG 200 (100% solids) and mixing. Finally, 2.6 g Silane (Momentive VS-142 40% activity, 10% in water) and 228 g water were added and mixed to yield 15% solids and then used for test of mechanical properties in bar tests.

Example 41

To 30.0 g lignosulfonate solution (50% solids), 0.4 g NH4OH (24.7%) was added and mixed followed by addition of 1.9 g Primid XL552 (100% solids) and 1.7 g PEG 200 (100% solids) and 1.7 g urea (100% solids) and mixing. Finally, 0.7 g Silane (Momentive VS-142 40% activity, 10% in water) and 60.5 g water were added and mixed to yield 15% solids and then used for test of mechanical properties in bar tests.

Mechanical properties are presented in Tables 1.1-1.6. Further example binder compositions were prepared, as shown in Tables 1.1 to 1.6. For simplicity, quantities of all other components are recalculated based on 100 g of dry lignin.

As can be seen from Table 1.1 a combination of cross-linker (Primid XL 552) and plasticizer (PEG 200) is required to achieve high mechanical properties (unaged and aged strength in bar test) that are at comparable level to reference binder (11 and 15 versus 2 and 9 versus reference binder).

Table 1.2 and 1.3 show that different plasticizers can be used (13 and 15 versus 30) or combination of plasticizers (34 versus 41) and that the PEG 200 is a preferred plasticizer.

Table 1.4 shows that addition of silane can help achieve aged strength on the same level as reference binders.

Table 1.5 shows that the binder has high strength without the presence of a base but that a non-permanent base ($NH_4OH$) or a permanent base (KOH) can be added to the formulation to protect the production equipment from corrosion without significant changes in strength.

Table 1.6 shows that different lignosulfonates can be used.

This overall means, we are able to produce a MMVF product based on a phenol-free and formaldehyde-free binder composition with a high content of renewable material based on lignin, which has comparable mechanical properties to the reference systems and can be produced in a simpler and less expensive way.

TABLE 1.1

| | Reference binder (Phenol-formaldehyde resin modified with urea, a PUF-resol) | Reference binder (binder based on alkali oxidized lignin) | 1 | 2 | 8 | 9 | 10 | 11 | 15 |
|---|---|---|---|---|---|---|---|---|---|
| Binder composition | | | | | | | | | |
| ammonium lignosulfonate (g dry lignin) | | | 100 | 100 | 100 | 100 | 100 | 100 | 100 |
| ammonium calcium lignosulfonate (g dry lignin) | | | | | | | | | |
| PEG 200 (g) | | | 0 | 0 | 23 | 40 | 23 | 23 | 23 |
| 1,1,1 tris(hydroxymethyl)propane (g) | | | | | | | | | |
| urea (g) | | | | | | | | | |
| NH4OH (g) | | | 0.8 | 0.8 | 0.8 | 0.8 | 0.8 | 0.8 | 0.8 |
| KOH (g) | | | | | | | | | |
| Primid XL552 (g) | | | 0 | 14 | 0 | 0 | 7 | 14 | 20 |
| Momentive VS 142 (% of binder solids), based on 40% activity | | | 0.5 | 0.5 | 0.5 | 0.5 | 0.5 | 0.5 | 0.5 |
| Binder properties | | | | | | | | | |
| Mechanical strength, unaged (N), bars tests | 350 | 270 | 60 | 280 | 70 | 150 | 110 | 230 | 320 |
| Mechanical strength, aged (N), bar tests | 150 | 130 | 0 | 50 | 20 | 40 | 50 | 140 | 130 |
| Curing temp, ° C. | 200 | 225 | 225 | 225 | 225 | 225 | 225 | 225 | 225 |

TABLE 1.2

| | 12 | 13 | 15 | 26 | 27 | 28 | 29 | 30 |
|---|---|---|---|---|---|---|---|---|
| Binder composition | | | | | | | | |
| ammonium lignosulfonate (g dry lignin) | 100 | 100 | 100 | 100 | 100 | 100 | 100 | 100 |
| ammonium calcium lignosulfonate (g dry lignin) | | | | | | | | |
| PEG 200 (g) | 23 | 23 | 23 | | | | | |
| 1,1,1 tris(hydroxymethyl)propane (g) | | | | 23 | 23 | 40 | 23 | 23 |
| urea (g) | | | | | | | | |
| Primid XL552 (g) | 13 | 13 | 20 | 0 | 0 | 0 | 20 | 20 |
| NH4OH (g) | 0.8 | 0.8 | 0.8 | 0.8 | 0.8 | 0.8 | 0.8 | 0.8 |
| KOH (g) | | | | | | | | |
| Momentive VS 142 (% of binder solids), based on 40% activity | 0 | 0.5 | 0.5 | 0 | 0.5 | 0.5 | 0 | 0.5 |
| Binder properties | | | | | | | | |
| Mechanical strength, unaged (N), bars tests | 250 | 250 | 320 | 80 | 90 | 90 | 200 | 210 |
| Mechanical strength, aged (N), bar tests | 30 | 110 | 130 | 10 | 10 | 20 | 60 | 100 |
| Curing temp, ° C. | 225 | 225 | 225 | 225 | 225 | 225 | 225 | 225 |

TABLE 1.3

| | 34 | 36 | 39 | 40 | 41 |
|---|---|---|---|---|---|
| Binder composition | | | | | |
| ammonium lignosulfonate (g dry lignin) | 100 | 100 | 100 | 100 | 100 |
| ammonium calcium lignosulfonate (g dry lignin) | | | | | |
| PEG 200 (g) | 23 | 12 | 4.5 | 0 | 12 |
| 1,1,1 tris(hydroxymethyl)propane (g) | | | | | |
| urea (g) | | | | | 12 |
| Primid XL552 (g) | 13 | 13 | 13 | 13 | 13 |
| NH4OH (g) | 0.8 | 0.8 | 0.8 | 0.8 | 0.8 |
| KOH (g) | | | | | |
| Momentive VS 142 (% of binder solids), based on 40% activity | 0.5 | 0.5 | 0.5 | 0.5 | 0.5 |
| Binder properties | | | | | |
| Mechanical strength, unaged (N), bars tests | 150 | 150 | 140 | 60 | 135 |
| Mechanical strength, aged (N), bar tests | 60 | 50 | 40 | 20 | 40 |
| Curing temp, ° C. | 225 | 225 | 225 | 225 | 225 |

TABLE 1.4

|  | 12 | 13 | 14 | 15 | 29 | 30 |
|---|---|---|---|---|---|---|
| Binder composition | | | | | | |
| ammonium lignosulfonate (g dry lignin) | 100 | 100 | 100 | 100 | 100 | 100 |
| ammonium calcium lignosulfonate (g dry lignin) | | | | | | |
| PEG 200 (g) | 23 | 23 | 23 | 23 | | |
| 1,1,1 tris(hydroxymethyl)propane (g) | | | | | 23 | 23 |
| urea (g) | | | | | | |
| Primid XL552 (g) | 13 | 13 | 20 | 20 | 20 | 20 |
| NH4OH (g) | 0.8 | 0.8 | 0.8 | 0.8 | 0.8 | 0.8 |
| KOH (g) | | | | | | |
| Momentive VS 142 (% of binder solids), based on 40% activity | 0 | 0.5 | 0 | 0.5 | 0 | 0.5 |
| Binder properties | | | | | | |
| Mechanical strength, unaged (N), bars tests | 250 | 250 | 380 | 320 | 200 | 210 |
| Mechanical strength, aged (N), bar tests | 30 | 110 | 40 | 130 | 60 | 100 |
| Curing temp, °C. | 225 | 225 | 225 | 225 | 225 | 225 |

TABLE 1.5

|  | 31 | 32 | 33 |
|---|---|---|---|
| Binder composition | | | |
| ammonium lignosulfonate (g dry lignin) | 100 | 100 | 100 |
| ammonium calcium lignosulfonate (g dry lignin) | | | |
| PEG 200 (g) | 23 | 23 | 23 |
| 1,1,1 tris(hydroxymethyl)propane (g) | | | |
| urea (g) | | | |
| Primid XL552 (g) | 22 | 22 | 22 |
| NH4OH (g) | 0 | 1.0 | 0 |
| KOH (g) | 0 | 0 | 0.6 |
| Momentive VS 142 (% of binder solids), based on 40% activity | 0.5 | 0.5 | 0.5 |
| Binder properties | | | |
| Mechanical strength, unaged (N), bars tests | 330 | 300 | 290 |
| Mechanical strength, aged (N), bar tests | 160 | 120 | 130 |
| Curing temp, °C. | 225 | 225 | 225 |

TABLE 1.6

|  | 11 | 15 | 45 | 46 |
|---|---|---|---|---|
| Binder composition | | | | |
| ammonium lignosulfonate (g dry lignin) | 100 | 100 | | |
| ammonium calcium lignosulfonate (g dry lignin) | | | 100 | 100 |
| PEG 200 (g) | 23 | 23 | 23 | 23 |
| 1,1,1 tris(hydroxymethyl)propane (g) | | | | |
| urea (g) | | | | |
| Primid XL552 (g) | 13 | 20 | 13 | 20 |
| NH4OH (g) | 0.8 | 0.8 | 0.8 | 0.8 |
| KOH (g) | | | | |
| Momentive VS 142 (% of binder solids), based on 40% activity | 0.5 | 0.5 | 0.5 | 0.5 |
| Binder properties | | | | |
| Mechanical strength, unaged (N), bar tests | 230 | 320 | 210 | 300 |
| Mechanical strength, aged (N), bar tests | 140 | 130 | 120 | 130 |
| Curing temp, °C. | 225 | 225 | 225 | 225 |

Examples 47-54

In the following, the entry numbers of the binder example correspond to the entry numbers used in Table 2.1.

The carboxylic acid group content of all lignosulfonates used for the binders according to the present invention was measured using 31P NMR and was found to be in the range of 0.05 to 0.6 mmol/g, based on the dry weight of the lignosulfonate lignins, while it was found for this specific batch used for examples 47, 48, 49, 50, 51, 52, 53, 54 to be 0.14 mmol/g.

Example 47

To 30.0 g lignosulfonate solution (50% solids), 0.4 g NH4OH (24.7%) was added and mixed followed by addition of 0.7 g Silane (Momentive VS-142 40% activity, 10% in water) and 68.9 g water were added and mixed to yield 15% solids and then used for test of mechanical properties in bar tests.

Example 49

To 30.0 g lignosulfonate solution (50% solids), 0.4 g NH4OH (24.7%) was added and mixed followed by addition of 6.0 g Primid XL552 (100% solids) and mixing. Finally, 1.0 g Silane (Momentive VS-142 40% activity, 10% in water) and 102.6 g water were added and mixed to yield 15% solids and then used for test of mechanical properties in bar tests.

Mechanical properties are presented in Table 2.1. Further example binder compositions were prepared, as shown in Table 2.1. For simplicity, quantities of all other components are recalculated based on 100 g of dry lignin.

As can be seen from Table 2.1, in a combination of lignosulfonate and crosslinker (Primid XL 552) higher amounts of crosslinker lead to better mechanical properties.

TABLE 2.1

|  | PUF ref | 47 | 48 | 49 | 50 |
|---|---|---|---|---|---|
| Binder composition | | | | | |
| ammonium lignosulfonate (g solids) | | 100 | 100 | 100 | 100 |
| PEG 200 (g) | | 0 | 0 | 0 | 0 |
| urea (g) | | | | | |
| ammonia, 24.7% (g) | | 2.5 | 2.5 | 2.5 | 2.5 |
| Primid XL552 (g) | | 0 | 25 | 40 | 60 |
| Momentive VS 142 (% of binder solids), based on 40% activity | | 0.5 | 0.5 | 0.5 | 0.5 |

TABLE 2.1-continued

| | PUF ref | 47 | 48 | 49 | 50 |
|---|---|---|---|---|---|
| Binder properties | | | | | |
| Mechanical strength, unaged (N), bars tests | 350 | 60 | 280 | 460 | 640 |
| Mechanical strength, aged (N), bar tests | 150 | 0 | 160 | 180 | 230 |
| Curing temp, ° C. | 200 | 225 | 225 | 225 | 225 |

Examples 53-54: Test of Stone Wool Products

The low density products have been examined for properties according to the product standard for Factory made mineral wool (MW) products, DS/EN13162:2012+A1:2015, meaning relevant mechanical properties besides other basic characteristics for stone wool products.

The testing has been performed on slabs, where test specimens according to the dimensional specifications and to the number of test specimens required to get one test result, as stated in EN13162 for each of the different test methods, has been cut out. Each of the stated values for the mechanical properties obtained is an average of more results according to EN13162.

Tests are performed on products or test specimens sampled directly from the production line before packing (line cuts) and/or for products or test specimens sampled from packs 24 hours after packing (24 h packs).

Dimensions

Dimensions of products and test specimens has been performed according to the relevant test methods, DS/EN822:2013: Thermal insulating products for building applications—Determination of length and width, and DS/EN823:2013: Thermal insulating products for building applications—Determination of thickness.

Binder Content (Loss On Ignition)

Determination of binder content is performed according to DS/EN13820:2003: Thermal insulating materials for building applications—Determination of organic content, where the binder content is defined as the quantity of organic material burnt away at a given temperature, stated in the standard to be (500±20° C.). In the testing the temperature (590±20° C., for at least 10 min or more until constant mass) has been used in order to make sure that all organic material is burnt away. Determination of ignition loss consists of at least 10 g wool corresponding to 8-20 cut-outs (minimum 8 cut-outs) performed evenly distributed over the test specimen using a cork borer ensuring to comprise an entire product thickness. The binder content is taken as the LOI. The binder includes binder additives.

Tensile Strength

The tensile strength of low density products has been determined according to EN 1608:2013: Thermal insulating products for building applications—Determination of tensile strength parallel to faces. The tensile strength is measured on test specimens from line cuts and on test specimens from 24 h packs.

Self Deflection (f70)

Self-deflection is measured according to an internal test method for determining the deflection caused by the net weight of a product. A test-specimen of length: 990±10 mm and width: min. 270±5 mm and max 680±5 mm is placed horizontally on two supports (tilting table) with a mutual centre distance of (700±2) mm and two moveable supporting devices. The self-deflection is measured in the middle of the specimen and recorded either mechanically or electrically (transducer with display) and read either on a scale or a digital display. If the original product is longer than 990±10 mm the extra length is cut off. The self-deflection is measured on both surfaces of the test specimen. The accuracy of measurement is ±0.2 mm for self-deflection<10 mm and ±1 mm for self-deflection>10 mm).

The self-deflection is reported as (f70, 70 cm span)=(f1+f2)/2 mm, where f1 is the measurement with surface 1 facing up and f2 is the measurement with surface 2 facing up. Testing is performed on test specimens from line cuts and on test specimens from 24 h packs.

Example 53

The stone wool product has been produced by use of binder in example 53, at a curing oven temperature set to 275° C.

609.0 kg of ammonium lignosulfonate was placed in a mixing vessel to which 8 l NH4OH (24.7%) was added and stirred. Afterwards, 384 kg Primid XL552 solution (pre-made 31 wt % solution in water) was added and mixed followed by addition of 14 kg Silane (Momentive VS-142 40% activity, 10% in water).

The binder from this example is used to produce a low density stone wool product, thickness and density were measured as indicated in Table 3.1. Curing oven temperature was set to 275° C.

Example 54

The stone wool product has been produced by use of binder in example 54, at a curing oven temperature set to 255° C.

730.0 kg of ammonium lignosulfonate was placed in a mixing vessel to which 8.5 l NH4OH (24.7%) was added and stirred. Afterwards, 151 kg Primid XL552 solution (pre-made 31 wt % solution in water) and 43 kg PEG 200 (100% solids) were added and mixed followed by addition of 13 kg Silane (Momentive VS-142 40% activity, 10% in water).

The binder from this example is used to produce a high density stone wool product, 100 mm thickness, 145 kg/m$^3$ density, wherein the product has a loss on ignition (LOI) of 3.5 wt %. Curing oven temperature was set to 255° C.

TABLE 3.1

| | Tensile strength, crosswise - packs | | | | | Tensile strength, crosswise - line cuts | | | |
|---|---|---|---|---|---|---|---|---|---|
| | | | Self | | | | | | |
| Example | Thickness mm | Ignition loss % | deflection f(70) mm | Sample density kg/m3 | Sigma (t) kPa | Ignition loss % | Thickness mm | Sample density kg/m3 | Sigma (t) kPa |
| PUF-reference | 145 | 2.82 | 7.2 | 32.3 | 7.6 | 2.50 | 153 | 31.0 | 10.2 |
| 53 | 139 | 2.81 | 8.9 | 34.3 | 6.7 | 2.54 | 158 | 30.7 | 8.7 |

What is claimed is:

1. A method of growing plants in a coherent growth substrate product, the method comprising:
providing at least one coherent growth substrate product comprising man-made vitreous fibres (MMVF) bonded with a cured aqueous binder composition free of phenol and formaldehyde;
positioning one or more seeds, seedlings, cuttings or plants in contact with the growth substrate product; and
irrigating the growth substrate product, wherein the aqueous binder composition prior to curing comprises:
a component (i) in form of one or more lignosulfonate lignins having a carboxylic acid group content of 0.03 to 1.4 mmol/g, based on the dry weight of the lignosulfonate lignins; and
a component (ii) in form of one or more cross-linkers.

2. The method according to claim 1, wherein the aqueous binder composition further comprises a component (iii) in form of one or more plasticizers.

3. The method according to claim 2, wherein component (iii) is in form of at least one of the following:
one or more plasticizers selected from the group consisting of fatty alcohols, monohydroxy alcohols, such as pentanol, stearyl alcohol;
one or more plasticizers selected from the group consisting of alkoxylates such as ethoxylates, such as butanol ethoxylates, such as butoxytriglycol;
one or more plasticizers in form of propylene glycols;
one or more plasticizers in form of glycol esters;
one or more plasticizers selected from the group consisting of adipates, acetates, benzoates, cyclobenzoates, citrates, stearates, sorbates, sebacates, azelates, butyrates, valerates;
one or more plasticizers selected from the group consisting of phenol derivatives, such as alkyl or aryl substituted phenols;
one or more plasticizers selected from the group consisting of silanols, siloxanes;
one or more plasticizers selected from the group consisting of sulfates such as alkyl sulfates, sulfonates such as alkyl aryl sulfonates such as alkyl sulfonates, phosphates such as tripolyphosphates;
one or more plasticizers in form of hydroxy acids;
one or more plasticizers selected from the group consisting of monomeric amides, such as acetamides, benzamide, fatty acid amides such as tall oil amides;
one or more plasticizers selected from the group consisting of quaternary ammonium compounds such as trimethylglycine, distearyldimethylammoniumchloride;
one or more plasticizers selected from the group consisting of vegetable oils such as castor oil, palm oil, linseed oil, soybean oil;
tall oil,
one or more plasticizers selected from the group consisting of hydrogenated oils, acetylated oils;
one or more plasticizers selected from acid methyl esters;
one or more plasticizers selected from the group consisting of alkyl polyglucosides, gluconamides, aminoglucoseamides, sucrose esters, sorbitan esters;
one or more plasticizers selected from the group consisting of polyethylene glycols, polyethylene glycol ethers;
one or more plasticizers in form of polyols, such as glycerol, such as 1,1,1-Tris(hydroxymethyl) propane; and
triethanolamine.

4. The method according to claim 2, wherein component (iii) is in form of propylene glycols, phenol derivatives, silanols, siloxanes, hydroxy acids, vegetable oils, polyethylene glycols, polyethylene glycol ethers, triethanolamine, or any mixtures thereof.

5. The method according to claim 2, wherein component (iii) comprises one or more plasticizers having a boiling point of 100 to 380° C.

6. The method according to claim 2, wherein component (iii) comprises one or more polyethylene glycols having an average molecular weight of 150 to 50000 g/mol.

7. The method according to claim 2, wherein the component (iii) is present in an amount of 0.5 to 60 based on the dry weight of component (i).

8. The method according to claim 1, wherein the aqueous binder composition does not comprise a cross-linker selected from:
epoxy compounds having a molecular weight Mw of 500 or less;
carbonyl compounds selected from aldehydes, carbonyl compounds of the formula $R-[C(O)R_1]_x$ in which: R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, $R_1$ represents a hydrogen atom or a C1-C10 alkyl radical, and x varies from 1 to 10;
polyamines.

9. The method according to claim 1, wherein component (i) has a carboxylic acid group content of 0.05 to 0.6 mmol/g, based on the dry weight of lignosulfonate lignins.

10. The method according to claim 1, wherein component (i) is in form of one or more lignosulfonate lignins having an average carboxylic acid group content of less than $1.8$ groups per macromolecule considering the $M\_n$ wt. average of component (i).

11. The method according to claim 1, wherein component (i) has a content of phenolic OH groups of 0.3 to 2.5 mmol/g based on the dry weight of lignosulfonate lignins.

12. The method according to claim 1, wherein component (i) has a content of aliphatic OH groups of 1.0 to 8.0 mmol/g based on the dry weight of lignosulfonate lignins.

13. The method according to claim 1, wherein the component (i) comprises ammoniumlignosulfonates and/or calciumlignosulfonates, and/or magnesiumlignosulfonates, and any combinations thereof.

14. The method according to claim 1, wherein component 1 comprises ammoniumlignosulfonates and calciumlignosulfonates, wherein the molar ratio of $NH_4^+$ to $Ca_2^+$ is in the range of 5:1 to 1:5.

15. The method according to claim 1, wherein the aqueous binder composition contains added sugar in an amount of 0 to less than 5 wt.-%, based on the weight of lignosulfonate and sugar.

16. The method according to claim 1, wherein the aqueous binder composition comprises component (i) in an amount of 50 to 98 wt.-% based on the dry weight of components (i) and (ii).

17. The method according to claim 1, wherein the component (ii) is in form of one or more cross-linkers selected from:
β-hydroxyalkylamide-cross-linkers; and/or
oxazoline-cross-linkers; and/or
the group consisting of multifunctional organic amines such as an alkanolamine, diamines, such as hexamethyldiamine; and/or
epoxy compounds having a molecular weight of more than 500, such as an epoxidised oil based on fatty acid triglyceride or one or more flexible oligomer or polymer, such as a low Tg acrylic based polymer, such as a low Tg vinyl based polymer, such as low Tg polyether, which contains reactive functional groups such as carbodiimide groups, such as anhydride groups, such as oxazoline groups, such as amino groups, such as epoxy groups; and/or
one or more cross-linkers selected from the group consisting of fatty amines; and/or
one more cross-linkers in form of fatty amides; and/or
one or more cross-linkers selected from polyester polyols, such as polycaprolactone; and/or
one or more cross-linkers selected from the group consisting of starch, modified starch, CMC; and/or
one or more cross-linkers in form of multifunctional carbodiimides, such as aliphatic multifunctional carbodiimides; and/or
one or more cross-linkers selected from melamine based cross-linkers, such as a hexakis(methylmethoxy) melamine (HMMM) based cross-linkers.

18. The method according to claim 1, wherein the component (ii) comprises one or more cross-linkers selected from β-hydroxyalkylamide-cross-linkers and/or oxazoline-cross-linkers.

19. The method according to claim 1, comprising component (ii) in an amount of 1 to 50 wt based on the dry weight of component (i).

20. The method according to claim 1, wherein the component (ii) is in form of one or more cross-linkers selected from:
β-hydroxyalkylamide-cross-linkers, such as N-(2-hydroxyisopropyl)amide-cross-linkers, such as N-(2-hydroxyethyl)amide-cross-linkers, such as N-(2-hydroxyethyl) adipamide-cross-linkers, such as N,N,N',N'-tetrakis(2-hydroxyethyl) adipamide; and/or
the group consisting of multifunctional organic amines such as an alkanolamine, diamines, such as hexamethyldiamine; and/or
epoxy compounds having a molecular weight of more than 500, such as an epoxidised oil based on fatty acid triglyceride or one or more flexible oligomer or polymer, such as a low Tg acrylic based polymer, such as a low Tg vinyl based polymer, such as low Tg polyether, which contains reactive functional groups such as carbodiimide groups, such as anhydride groups, such as oxazoline groups, such as amino groups, such as epoxy groups; and/or
one or more cross-linkers in form of multifunctional carbodiimides, such as aliphatic multifunctional carbodiimides.

21. The method according to claim 1, wherein the component (ii) comprises one or more cross-linkers selected from β-hydroxyalkylamide-cross-linkers, such as N-(2-hydroxyisopropyl)amide-cross-linkers, such as N-(2-hydroxyethyl)amide-cross-linkers, such as N-(2-hydroxyethyl) adipamide-cross-linkers, such as N,N,N',N'-tetrakis(2-hydroxyethyl) adipamide.

22. The method according to claim 1, comprising component (ii) in an amount of 2 to 90 wt.-%, such as 6 to 60 wt.-% based on the dry weight of component (i).

23. The method according to claim 1, wherein the aqueous binder composition comprises a further component (iv) in form of one or more coupling agents, such as organofunctional silanes.

24. The method according to claim 1, wherein the aqueous binder composition comprises a component (v) in form of one or more components selected from the group of bases, such as ammonia, such as alkali metal hydroxides, such as KOH, such as earth alkaline metal hydroxides, such as $Ca(OH)_2$, such as $Mg(OH)_2$, such as amines or any salts thereof.

25. The method according to claim 1, wherein the aqueous binder composition comprises a further component in form of urea, in particular in an amount 5 to 40 wt.-% based on the dry weight of component (i).

26. The method according to claim 1, wherein the coherent growth substrate product does not contain an ammonia-oxidized lignin (AOL).

27. The method according to claim 1 wherein the coherent growth substrate product comprises man-made vitreous fibres with a contact angle with water of less than 90°.

28. The method according to claim 1, wherein the coherent growth substrate product comprises man-made vitreous fibres with a geometric mean fibre diameter in the range of 1.5 to 10 microns.

29. The method according to claim 1, wherein the coherent growth substrate product has a volume in the range of 0.003 litres to 87 litres.

30. The method according to claim 1, wherein the coherent growth substrate product comprises a liquid-impermeable covering.

31. The method according to claim 1, wherein the coherent growth substrate product has a height of 10 mm to 150 mm.

32. The method according to claim 1, wherein the coherent growth substrate product does not comprise any wetting agent.

33. A coherent growth substrate product comprising man-made vitreous fibres (MMVF) bonded with a cured aqueous binder composition free of phenol and formaldehyde, wherein the aqueous binder composition prior to curing comprises:

a component (i) in form of one or more lignosulfonate lignins having a carboxylic acid group content of 0.03 to 1.4 mmol/g, based on the dry weight of the lignosulfonate lignins, a component (ii) in form of one or more cross-linkers.

34. The coherent growth substrate product according to claim 33, wherein the coherent growth substrate product further has at least one of the following features:
   a) the coherent growth substrate product does not contain an ammonia-oxidized lignin (AOL);
   b) the coherent growth substrate product comprises man-made vitreous fibres with a contact angle with water of less than 90°;
   c) the coherent growth substrate product comprises man-made vitreous fibres with a geometric mean fibre diameter in the range of 1.5 to 10 microns;
   d) the coherent growth substrate product has a volume in the range of 0.003 litres to 87 litres;
   e) the coherent growth substrate product comprises a liquid-impermeable covering;
   f) the coherent growth substrate product has a height of 10 mm to 150 mm; and
   g) the coherent growth substrate product does not comprise any wetting agent.

35. An array of two or more coherent growth substrate products, wherein each coherent growth substrate product is the coherent growth substrate product according to claim 33.

36. Use of a coherent growth substrate product in a method for growing plants, said method comprising:
   (i) positioning one or more seeds, seedlings cuttings or plants in contact with the coherent growth substrate product, and
   (ii) irrigating the coherent growth substrate product,
   wherein the coherent growth substrate product comprises man-made vitreous fibres (MMVF) bonded with a cured aqueous binder composition free of phenol and formaldehyde, wherein the aqueous binder composition prior to curing comprises:
      a component (i) in form of one or more lignosulfonate lignins having a carboxylic acid group content of 0.03 to 1.4 mmol/g, based on the dry weight of the lignosulfonate lignins; and
      a component (ii) in form of one or more cross-linkers.

37. Use according to claim 36, wherein the coherent growth substrate product further has at least one of the following features:
   a) the coherent growth substrate product does not contain an ammonia-oxidized lignin (AOL);
   b) the coherent growth substrate product comprises man-made vitreous fibres with a contact angle with water of less than 90°;
   c) the coherent growth substrate product comprises man-made vitreous fibres with a geometric mean fibre diameter in the range of 1.5 to 10 microns;
   d) the coherent growth substrate product has a volume in the range of 0.003 litres to 87 litres;
   e) the coherent growth substrate product comprises a liquid-impermeable covering;
   f) the coherent growth substrate product has a height of 10 mm to 150 mm; and
   g) the coherent growth substrate product does not comprise any wetting agent.

38. A method of making a coherent growth substrate product comprising the steps of:
   (i) providing MMVF;
   (ii) spraying the MMVF with an aqueous binder composition free of phenol and formaldehyde;
   (iii) collecting and consolidating the MMVF; and
   (iv) curing the aqueous binder composition,
   wherein the aqueous binder composition prior to curing comprises:
      a component (i) in form of one or more lignosulfonate lignins having a carboxylic acid group content of 0.03 to 1.4 mmol/g, based on the dry weight of the lignosulfonate lignins; and
      a component (ii) in form of one or more cross-linkers.

39. Use of a lignin component in form of one or more lignosulfonate lignins having a carboxylic acid group content of 0.03 to 1.4 mmol/g, based on the dry weight of the lignosulfonate lignins, for a method of preparation of a binder composition free of phenol and formaldehyde for a coherent growth substrate product comprising man-made vitreous fibres (MMVF), said method comprising the steps of combining said lignin component with one or more cross-linkers.

* * * * *